US012404924B2

(12) United States Patent
Mason et al.

(10) Patent No.: US 12,404,924 B2
(45) Date of Patent: Sep. 2, 2025

(54) DEVICES AND METHOD FOR REGULATING COOLER FLOW THROUGH AUTOMOTIVE TRANSMISSIONS

(71) Applicant: SUPERIOR TRANSMISSION PARTS, INC., Tallahassee, FL (US)

(72) Inventors: Dean Mason, Tallahassee, FL (US); Victor Castano, Tallahassee, FL (US)

(73) Assignee: SUPERIOR TRANSMISSION PARTS, INC., Tallahassee, FL (US)

( * ) Notice: Subject to any disclaimer, the term of this patent is extended or adjusted under 35 U.S.C. 154(b) by 244 days.

(21) Appl. No.: 18/220,497

(22) Filed: Jul. 11, 2023

(65) Prior Publication Data

US 2023/0349460 A1 Nov. 2, 2023

Related U.S. Application Data

(63) Continuation-in-part of application No. 17/288,720, filed as application No. PCT/US2019/058831 on Oct. 30, 2019, now Pat. No. 11,725,891.

(60) Provisional application No. 63/458,465, filed on Apr. 11, 2023, provisional application No. 62/752,539, filed on Oct. 30, 2018.

(51) Int. Cl.
*F16H 57/00* (2012.01)
*F01P 7/14* (2006.01)
*F16H 57/04* (2010.01)

(52) U.S. Cl.
CPC ............ *F16H 57/0413* (2013.01); *F01P 7/14* (2013.01); *F01P 2007/146* (2013.01)

(58) Field of Classification Search
CPC .... F28F 27/02; F28F 2250/06; F28F 2265/12; F16K 15/026; F16K 15/028; F16K 15/03; F16K 17/04; F16K 17/0406; F16K 17/30; F16K 3/265; F16H 57/0413; F01P 7/14; F01P 2007/146
See application file for complete search history.

(56) References Cited

U.S. PATENT DOCUMENTS 4,292,990 A * 10/1981 Pareja .................. F16K 31/363 137/115.26
4,930,553 A * 6/1990 Grillo ................ F16K 17/0406 137/539.5
5,558,591 A * 9/1996 Erickson ............ F16H 57/0447 184/6.12
5,564,317 A * 10/1996 Gilroy ................ F16K 17/0406 137/565.35
8,671,569 B1 * 3/2014 White ...................... B23P 6/00 29/888.011

(Continued)

OTHER PUBLICATIONS

"Gears for the Transmssion Rebuilding Industry", Automatic Transmission Rebuilders Association, Mar. 2023, 3 pages.

*Primary Examiner* — Travis Ruby

(57) ABSTRACT

Methods and valves for providing a continuous flow of cooler fluid in a fluid circuit of a thermal control system between a cooler and automotive transmission such that free flow of cooler fluid between the cooler and transmission exists at vehicle start-up. Fluid flow to and from the cooler is bypassed in case of pressure increases in cooler lines or pressure differentials, for example cause by a blockage in the cooler, such that the cooler fluid flow bypasses the cooler and continues in the fluid circuit through a thermal element of the thermal control system and back to the transmission.

13 Claims, 24 Drawing Sheets

(56) References Cited

U.S. PATENT DOCUMENTS

| | | | | |
|---|---|---|---|---|
| 9,038,662 | B2 * | 5/2015 | Rickis | F16K 17/04 137/540 |
| 9,249,875 | B1 | 2/2016 | Mason | |
| 9,334,946 | B1 * | 5/2016 | Mason | F16K 11/0708 |
| 10,508,750 | B2 * | 12/2019 | Burris | F16K 27/0245 |
| 2006/0016900 | A1 * | 1/2006 | Brown | F16H 57/0413 236/34.5 |
| 2010/0126594 | A1 * | 5/2010 | Sheppard | F01P 7/16 137/340 |
| 2014/0109544 | A1 * | 4/2014 | Rickis | F04B 49/035 137/15.19 |
| 2017/0260882 | A1 * | 9/2017 | Brower | F16K 15/18 |
| 2017/0335956 | A1 * | 11/2017 | Mason | F16D 25/12 |

* cited by examiner

DEVICES AND METHOD FOR REGULATING COOLER FLOW THROUGH AUTOMOTIVE TRANSMISSIONS

CROSS-REFERENCE TO RELATED APPLICATIONS

This application is a continuation-in-part of U.S. patent application Ser. No. 17/288,720, filed on Apr. 26, 2021, which is a national stage entry of International Patent Application No. PCT/US2019/058831, filed on Oct. 30, 2019, which claims priority to U.S. Provisional Patent Application No. 62/752,539, filed on Oct. 30, 2018; and claims priority to U.S. Provisional Patent Application No. 63/458,465, filed on Apr. 11, 2023.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention relates to methods for improving OEM (original equipment manufacturer) systems for supplying cooled fluid lubricant through an automotive transmission, and to replacement parts for effecting said improvements, namely, improved thermal control system valves replacing OEM valves in automotive transmissions to improve performance and reduce maintenance costs.

Brief Discussion of the Prior Art

Most heat in an automatic transmission is generated in the torque converter (TC). Heat generation is relatively low during a lockup, or fluid coupling, phase, but during torque multiplication, and especially at maximum stall, high vortex flow forces fluid to make hard turns which generates a high level of fluid friction against internal component surfaces (for example, impeller, stator, and turbine). During sustained hard-working conditions in the transmission, fluid temperatures can flash up to 148.889-204.444° C. (300-400° F.). Thus, the most logical destination for liquid coolant, or fluid, flow is away from the torque converter is through a converter out line, which is a line directly away from the torque converter to the cooler. Since the fluid returning from the cooler is generally the coolest in the transmission, it is then ideal for fluid to flow through lubrication circuits (LUBE), where it lubricates and cools intermeshing gears, washers, bearings, and bushings under load. From there, the fluid drains into the sump where it is drawn through the sump filter by the pump, which supplies that line pressure from which converter feed is derived. Thus, the basic cycle for this portion of transmission function is SUMP—FILTER—PUMP SUCTION—PUMP OUTPUT—LINE SUPPLY—TC FEED—TC OUT—COOLER—LUBE—back to SUMP. This strategy is typical and has been employed universally in all automatic transmissions for nearly a century with only a few rare exceptions.

In the same way a catalytic converter offers back pressure (i.e., resistance to flow) in an exhaust system, the transmission fluid cooler offers resistance in the fluid cooling system of the transmission, resulting in a pressure differential between the converter out line to the cooler (also referred to as an out-line) as compared to a cooler return line to lubricate the transmission (also referred to as an in-line). Two examples will suffice to illustrate this pressure differential. First, Honda 4 and 5 speed transmissions will typically flow 6.309E-5 $m^3/s$ (1.5 gal/m (gallons per minute)) at 20-30 PSI (pressure/square inch) on the out-line, with about 41.369 kPa (6 PSI) in the in-line. A Ford 5R110W transmission will flow 0.0001262-0.0002524 $m^3/s$ (2-4 GPM) at 137.895-275.79 kPa (20-40 PSI) through the out-line, with 68.948-103.421 kPa (10-15 PSI) on the cooler in-line. In this manner it is typical for most transmission cooler systems to maintain a 103.421-172.369 kPa (15-25 PSI) differential between out and in lines on either side of the cooler.

With an increased use of internal transmission computers, solenoids, sensors, pressure switches, and so forth, in modern automobiles, in combination with adaptive-learn and advanced shift control strategy programming, car manufactures have concluded that it is advantageous to warm the transmission fluid to an optimum operating temperature as quickly as possible, and thereafter maintain that controlled temperature throughout the drive cycle of the vehicle. The assumption is that if fluid temperature and viscosity are held constant, transmission functions can be controlled more consistently.

It has become quite fashionable in automotive engineering to employ the use of a thermostatic switch device to regulate flow through the transmission cooler. This "thermal element", as it is most commonly called, is placed somewhere in the thermal control system of the transmission where it can connect the out-line and the in-line circuits. In some cases, it is utilized in coordination with a flow control valve. Sometimes the thermal element itself is designed as a compound part, and functions as a thermally expanding valve. Other times, the thermal element itself is the flow stop device without the aid of a valve. In all cases, whether secondary devices are employed or not, the fundamental principles do not change. Fluid temperature is thermostatically controlled in similar fashions. ATF (automatic transmission fluid, or fluid) in transmissions has a preferred best working temperature of 148.889-204.444° C. (50-180° F.). Generally, optimum running temperature in transmissions has typically been 62.778-73.889° C. (145-165° F.). Leaks, valve sticking, and other high-temperature malfunctions tend to appear above 9.333° C. (200° F.), but most notably above 107.222-112.778° C. (225-235° F.) or right above the boiling temperature of water. That's where issues in the thermal flow-controlled transmissions typically arise. On the cold side, issues begin to arise below the freezing temperature of water, and at −37.222 to −40° C. (−35 to −40° F.) below zero ATF begins to gel.

The actual physical location of the thermostatic switch device, or thermal element, in principle can be anywhere these two circuits can be physically bridged. Further, the cooler, the out-line, the in-line, and thermostatic switch device together are often referred to as a thermal bypass system. To date, manufacturers have used five different locations for the thermal element:

TABLE 1

| LOCATION | EXAMPLE TRANSMISSION |
|---|---|
| 1. In Transmission Pump | Ford 5R110W |
| 2. In Transmission Valve Body | Ford 4/5R55E, 5R55W, 5R55N, 5R55S |
| 3. In Transmission Case Under Valve Body | Ford 6R80 |
| 4. In The Cooler | Dodge 68RFE, 545RFE |
| 5. In The Cooler Lines | GM 6L80E; Ford 4R75W, 6F35 |

Regardless of location, the purpose of the thermal element is identical, and in many cases the same exact physical part is used, and by different manufactures. For example, one thermal element has been used in Ford, GM, Dodge, and Mercedes transmissions.

There is however a difference in accessibility and/or serviceability between these different locations. In the case of location #1, the transmission must be removed to access the pump. Location #2 requires valve body removal and disassembly. Location #3 requires valve body removal. Locations #4 and #5 are more easily and more cost effectively serviced, since they are external to the transmission. Thus, as more vehicles begin to use thermal flow control, location #5 is quickly becoming the preferred site for thermal element placement.

The structural shape of the thermal element also necessarily varies between most locations, most notability between a thermal element in the pump (location #1), an element in the valve body (location #2), an element in the case (location #3), and an element in the cooler or cooler lines (locations #4 and #5). Between the different possible locations, only valves used in locations #4 and #5 are likely to have an identical or highly similar structure, as the thermal element in the cooler lines (#4) can be integrally formed with the cooler (#5). Otherwise, a valve in the pump, for example, is not interchangeable with a valve meant to be used in a thermal element located in the transmission case.

There are a variety of different housings used to contain the thermal element of the same location between transmission manufacturers, but for the most part these are size and shape alterations necessary to accommodate differently sized cooler lines and different mounting locations. The valves used between these different housing shapes and sizes would be structured similarly, as the internal method of controlling cooler flow would be similar.

There are three possible states for known thermal bypass systems:

1. Fully OPEN when cooler is bypassed;
2. Fully CLOSED when ALL the flow is forced through the cooler; and
3. The INTERMEDIATE or PARTIAL ON state.

When the thermal element is fully open, fluid flows out of the converter, drops down and loops through the lockup control valve, and comes back up to a split. One direction goes to the flow valve. The other direction goes to the out fitting (out at the transmission and in at the cooler). Under pressure, flow always follows the path of least resistance, so the fluid flow chooses the in-line because the resistance in the cooler is much greater than that of the lube system. Pressure is transferred in both directions from the converter out circuit, but is equalized at the cooler return fitting, thus stopping cooler flow. Thus, in the OEM system, below a certain temperature, fluid flows in two directions and is stopped within the in-line near the connection of the cooler to the in-line. This system substantially prevents the flow of cooled fluid from the cooler to the transmission.

When the thermal element in an OEM system is fully closed, flow is restricted to one direction. This occurs when the fluid temperature is above the desired operating temperature. The thermal element is expanded sufficiently, due to silicon or a similar expanding element in the valve, to completely close the valve and prevent cooler bypass in order to force all fluid flow through the cooler to bring temperature down.

When the thermal element is cold, the valve allowing fluid flow through the thermal element is in an open, default position. When the thermal element is over the thermal temperature limit, for example, 121.111° C. (250° F.), the valve is in a closed, bypass position. But, as the fluid begins to cool, the thermal element begins to contract and holds the valve in a midway flow metering position where the valve is just cracking open in the bore. This is the normal operating state, where the element functions to sustain a predetermined ATF operating temperature, which is typically around 107.222-112.778° C. (225-235° F.). The thermal element holds the valve in a flow limiting position where part of the converter out flow goes through the cooler, and part of the flow bypasses through the thermal element directly to the transmission through the in-line. In this fashion, the fluid is partially cooled, and temperature is dynamically regulated. If ambient air temperature drops, and the cooler is more efficient, it bypasses more. If the air temperature rises, it pushes more fluid through the cooler.

There are multiple issues with this system, however, including:

- Overheating without setting diagnostic trouble codes as expected.
- Setting "phantom" codes as a result of erratic and inconsistent operation and/or temperature control.
- Silicon pack (thermal element valve) failure, leakage, and/or rupture with loss of fluid temperature control.
- Valves or other switching devices associated with the thermal element subject to sticking, which prevents proper and timely opening and closing of the thermal element.
- Cooler blocked and/or restricted with thermal system in cooler flow ON mode. This results in no cooler flow or lubrication, causing the planetary system to crash.
- When the thermal control system gets stuck in bypass mode, and cooler flow never begins, fluid can heat to nearly 400° F. At this temperature, if supplied oxygen, the ATF becomes a fuel and will sustain a fire.

Even when the thermal control system has not malfunctioned, high fluid operating temperatures increase expansion of valve body castings resulting in reduced and/or insufficient valve clearance. This causes slowed valve response to switching signals, sluggish regulation, and valve sticking with even the slightest amount of particle or carbon powder contamination. The same behavioral characteristics are observed with solenoids, especially PWM-type solenoids. Higher temperatures make it more difficult for adaptive learn solenoids to remain stable. The solenoids tend to drift, to dial in control of functions, while being compromised by temperature induced mechanical obstructions in multiple areas.

An improved thermal bypass control valve is discussed in U.S. Pat. No. 9,249,875 to Mason. The valve of Mason is designed to operate as part of a thermal element in location #2, the valve body, which is the location of the thermal element in Ford® 5R55 series transmissions. While the valve of Mason would be applicable to other transmissions with the thermal element located in location #2, the valve of Mason would not be applicable to transmissions having thermal elements in locations #1, #3, #4, or #5. Thus, the improved thermal bypass control valve provided in Mason transmission cannot be applied to all other transmissions.

In view of the foregoing, there is a need for an improved process for supplying cooler to all automotive transmissions to avoid potential damage that may be caused to transmissions due to failure or faulty operation of thermal elements across various models of transmissions. There is a need to ensure constant flow of fluid through the cooling system. There is also a need to ensure immediate fill of the cooling system with accurate fluid levels without a warm-up cycle. Further, there is a need for thermal bypass valves that accomplish these improvements across transmissions having the thermal element located in the pump, in the case, or in the cooler or cooler lines.

BRIEF SUMMARY OF THE INVENTION

The present invention is directed toward improved methods for regulating thermal control systems in automotive transmissions and thermal bypass valves that replace factory-original thermal bypass valves in thermal elements located at different locations within transmissions across multiple makes and models of such transmissions.

It is an objective of the instant disclosure to provide a method of converting an OEM thermal bypass control system from a three-state system to a two state system, comprising: removing a three-state OEM valve from a thermal element, wherein the OEM valve prevents any fluid flow between a transmission and a cooler in a default state, allows a full fluid flow between the transmission and the cooler past a fluid temperature threshold, and allows a partial fluid flow along a fluid temperature range below the fluid temperature threshold; replacing the OEM valve with a two-state valve in the thermal element; and the two-state valve allowing full fluid flow between the transmission and the cooler in a default state, and allowing for fluid bypass of the cooler when a pressure differential between fluid flowing from the transmission to the cooler and fluid flowing from the cooler to transmission exceeds a predetermined range.

Another objective of the instant disclosure is to provide a thermal bypass valve for installation into a transmission pump, the valve having a cylindrical blocker valve having a groove extending around a circumference of the blocker valve and along a length of the blocker valve, the groove defining an upper valve portion and a lower valve portion; a relief valve having a uniformly cylindrical body, a cylindrical cavity extending within and along a partial length of the relief valve, wherein the cylindrical cavity is open at a free end of the relief valve, and a cylindrical member extending from the relief valve along an end of the relief valve opposite the free end, wherein the cylindrical member has a smaller diameter than the relief valve; a spring; a valve plug; and a clip.

Another objective of the instant disclosure is to provide a thermal bypass valve for installation into a transmission case, the thermal bypass valve having a cylindrical body having an inner cylindrical cavity extending along a longitudinal length of the cylindrical body, the cylindrical body having a free end contiguous with the cylindrical cavity; a raised band coaxially extending around a circumference of the cylindrical body and proximate to the free end; a second raised band coaxially extending around a circumference of the cylindrical body along an end opposite the free end; a coaxial protrusion extending from the end opposite the free end; a tube extending within the cylindrical cavity proximate to the free end and perpendicularly to the longitudinal length of the cylindrical body, wherein the tube extends through opposite sides of the cylindrical body through two holes in the cylindrical body; a relief valve slidable within the cylindrical cavity; and a spring within the cylindrical cavity and compressible between the relief valve and a closed end of the cylindrical cavity; wherein a plurality of openings in the cylindrical body are positioned adjacent to the raised band, and a relief opening in the cylindrical body is positioned adjacent the second raised band; and wherein the thermal bypass valve is configured to insert into a transmission case of an automotive transmission.

Yet another objective of the instant disclosure is to provide a thermal bypass valve for installation into a cooler or external block connected to cooler lines, the thermal bypass valve having a cylindrical body, an inner cylindrical cavity extending along a longitudinal length of the cylindrical body, the cylindrical body having a free end contiguous with the cylindrical cavity, wherein a second cylindrical cavity is contiguous with the cylindrical cavity opposite the free end; a grooved blocker portion attached to the cylindrical body opposite the free end and adjacent to a grooved portion of the cylindrical cavity, the grooved portion having a plurality of openings into the second cylindrical cavity, wherein the grooved blocker portion has two grooves each extending along a circumference of the grooved blocker portion; and, a cap portion attached to the grooved blocker portion at an end opposite of the cylindrical body, the cap having a larger diameter than the grooved blocker portion, and a having a member attached at an end opposite the grooved blocker portion, a piston having a first cylindrical portion adjacent to a second cylindrical portion, the first cylindrical portion and second cylindrical portion defining a central cylindrical cavity extending along a longitudinal length of the piston and open at opposing free ends of the piston, wherein the first cylindrical portion has a greater diameter than the second cylindrical portion; a spring having an end with a smaller diameter than an opposing end; a bearing ball; two large O-rings; and a small O-ring, wherein the bearing ball is configured to rest partially within the second cylindrical cavity and secured by the spring along the end with a smaller diameter, and the spring is compressible by the piston along a free end of the first cylindrical portion, wherein the piston slidably engages the inner cylindrical cavity of the sleeve along the first cylindrical portion, wherein each O-ring of the two large O-rings engages a groove of the two grooves of the grooved blocker portion, wherein the small O-ring engages the circumference of the second cylindrical portion of the piston adjacent to the first cylindrical portion, and wherein the thermal bypass valve is configured to insert into an external thermostat block of an automotive transmission.

Embodiments of the present invention are intended to overcome the problems associated with lockup or other damage to components and gears within a transmission, especially the overdrive sun and planet gears of transmissions, by providing a replacement thermal bypass valve system which replaces the OEM thermal bypass valve system to provide a continuous flow cooler.

Another objective of the present invention is to provide replacement thermal bypass valves for different transmission series that default to a cooler flow ON state, instead of a cooler flow OFF state which is present in OEM thermal bypass valve systems.

A further objective of the present invention is to provide replacement thermal bypass valves for different transmission series that do not require a preheat cycle to raise temperatures to +212° F./+100° C. before allowing cooler to flow.

Yet another object of the present invention is to provide improved thermal control systems to increase cooler supply to and within transmissions to improve overall performance of the transmissions.

The present invention also provides for a thermal bypass valve, having a plug having an inner cavity longitudinally extending between two oppositely oriented openings and a cap configured to prevent fluid flow between the thermal bypass valve and a valve bore in a transmission, the plug configured to insert into an opening of the valve bore; a longitudinally extending plunger configured to be secured coaxially through the inner cavity of the plug and extending beyond the two oppositely oriented openings of the plug; a blocker valve having and a fluid channel longitudinally extending between two oppositely oriented blocker valve openings; a first spring configured to be secured between the plunger and the blocker valve; and a second spring configured to be secured between the blocker valve and a surface of the valve bore, wherein, when the thermal bypass valve is installed in a transmission, a position of the plunger relative to the plug is manually changeable to enable full transmission fluid flow to a cooler, full transmission fluid bypass of the cooler, and mixed transmission fluid flow to the cooler and to a warmer.

The thermal bypass valve may include a flange secured to the plunger adjacent to a first end of the plunger, the flange configured to engage the first spring and extending perpendicularly from the plunger relative to a longitudinal axis of the plunger.

Further, the blocker valve may have a lip for engaging the first spring.

The plug may further include an upper member and a lower member, the upper member and lower member longitudinally extending on either side of the cap.

The lower member may have one or more grooves extending circumferentially along an outer surface of the lower member, and may further include one or more plug O-rings, one plug O-ring of the one or more plug O-rings corresponding to a single groove of the one or more grooves extending along the outer surface of the lower member.

Further, the plunger may have one or more grooves extending circumferentially along an outer surface of the plunger, and may further include one or more plunger O-rings, one plunger O-ring of the one or more plunger O-rings corresponding to a single groove of the one or more grooves extending circumferentially along the outer surface of the plunger.

Further, the plunger may have a tapered surface along the first end.

The thermal bypass valve may further include a retaining clip, wherein the plug has a retaining clip groove extending circumferentially along an outer surface of the upper member, wherein the plunger has a plurality of flow grooves extending circumferentially along an outer surface of the plunger, and wherein the retaining clip is configured to simultaneously secure in the retaining groove and one flow groove of the plurality of flow grooves.

The thermal bypass valve may further a means to manually change a position of the plunger relative to the plug when the plunger is secured coaxially through the inner cavity of the plug and extending beyond the two oppositely oriented openings of the plug.

A better understanding of the systems and methods will be had with reference to the several views of the drawings described herein.

BRIEF DESCRIPTION OF THE SEVERAL VIEWS OF THE DRAWING

The present invention is shown and described in the following drawings.

DETAILED DESCRIPTION OF THE INVENTION

Figure 1:
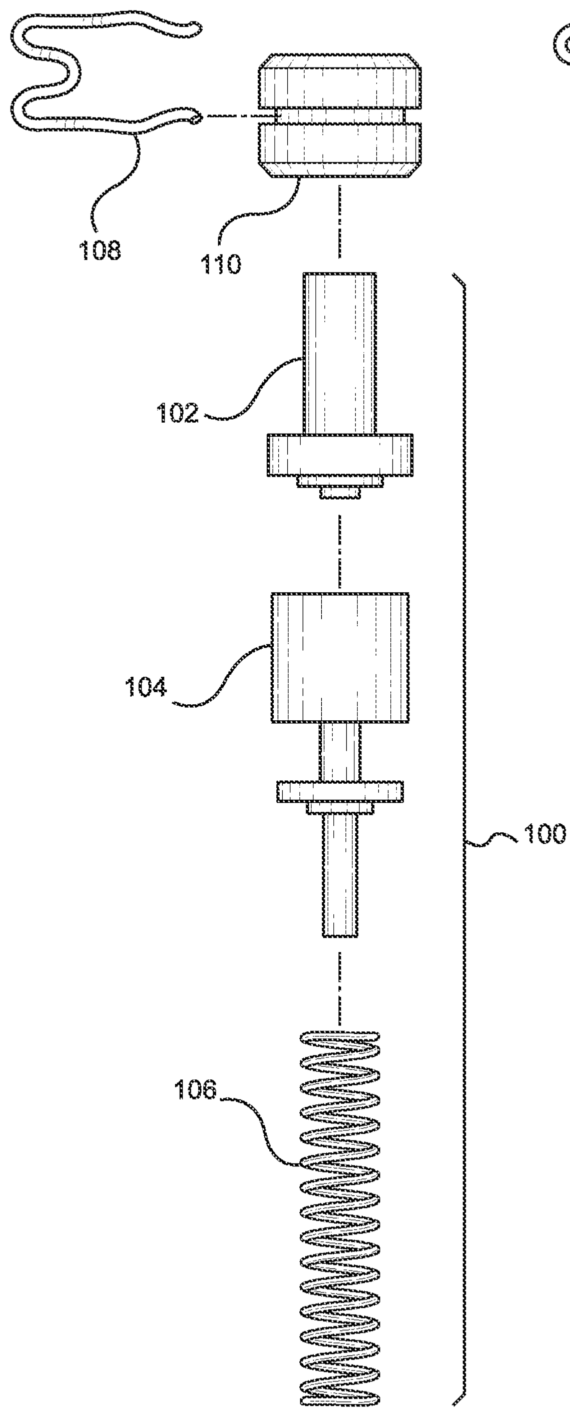
FIG. 1 shows components of a factory-original thermal control bypass valve for installation in a transmission pump.

In the following detailed description, systems, apparatuses, and methods for improving thermal control in automotive transmissions are described by providing references to the accompanying drawings which form a part of the description of how the invention works and does not limit the scope of the present invention. The present invention solves the problem of insufficient cooler flow to and through automotive transmissions due to OEM parts set to bypass fluid flow through the cooler by providing thermal bypass valves with improved structures that replace OEM thermostatic valves and increase cooler flow to and through referenced transmissions by defaulting the thermal control system to fluid flow through the cooler.

It will be appreciated that for simplicity and clarity of illustration, reference numerals may be repeated among the figures to indicate corresponding or analogous elements. In addition, numerous specific details are set forth to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Dimensions are provided for valves and their individual parts and components. Such dimensions are typically identified as either diameter or length and denoted with $D_n$ or $L_n$. The dimensions are specific to the part particularly referenced and do not share common values across like-numbered elements in other valves or valve parts.

An OEM thermostatic valve 100 for installation in a transmission pump is shown in FIG. 1. The valve 100 includes an upper portion 102, a lower portion 104, a spring 106, a valve plug 110, and a clip 108 to secure the valve plug in place. As discussed, the OEM thermostatic valve 100 defaults to a cooler flow OFF state, preventing flow of cooled fluid through the cooler system. In the OFF state, fluid is allowed to flow in both directions to the cooler (i.e. clockwise and counterclockwise in a fluid circuit), which causes a near equilibrium that substantially stops flow out of the cooler near a connection of the cooler and in-line. To switch the OEM thermal control system to a cooler flow ON state, a preheat cycle is required to raise temperatures to above 100° C. (212° F.). This in turn causes the OEM thermostatic valve to begin to close off fluid flow both directions to the cooler, and force fluid flow in a single direction such that hot fluid leaves the transmission enters the cooler to be cooled and is returned as cool fluid to the transmission. When the transmission is cooler than 165° F. (nominal) the flow of lubricant to the cooler is cut by 90%. The reduced flow is directed to lube, then to the pan. Therefore, if the transmission is cool enough for the thermostat to remain in the cooler flow OFF state, 90% of the new fluid mixes with the old fluid, while only 10% flows out and is replaced. If the OEM thermal bypass system malfunctions and the system is not turned to an ON state, the oil and transmission overheat due to a lack of freshly cooled lubricant supply. This in turn affects the pump, valve body, solenoids, sealing rings, and clutch drum operation.

Figure 2:
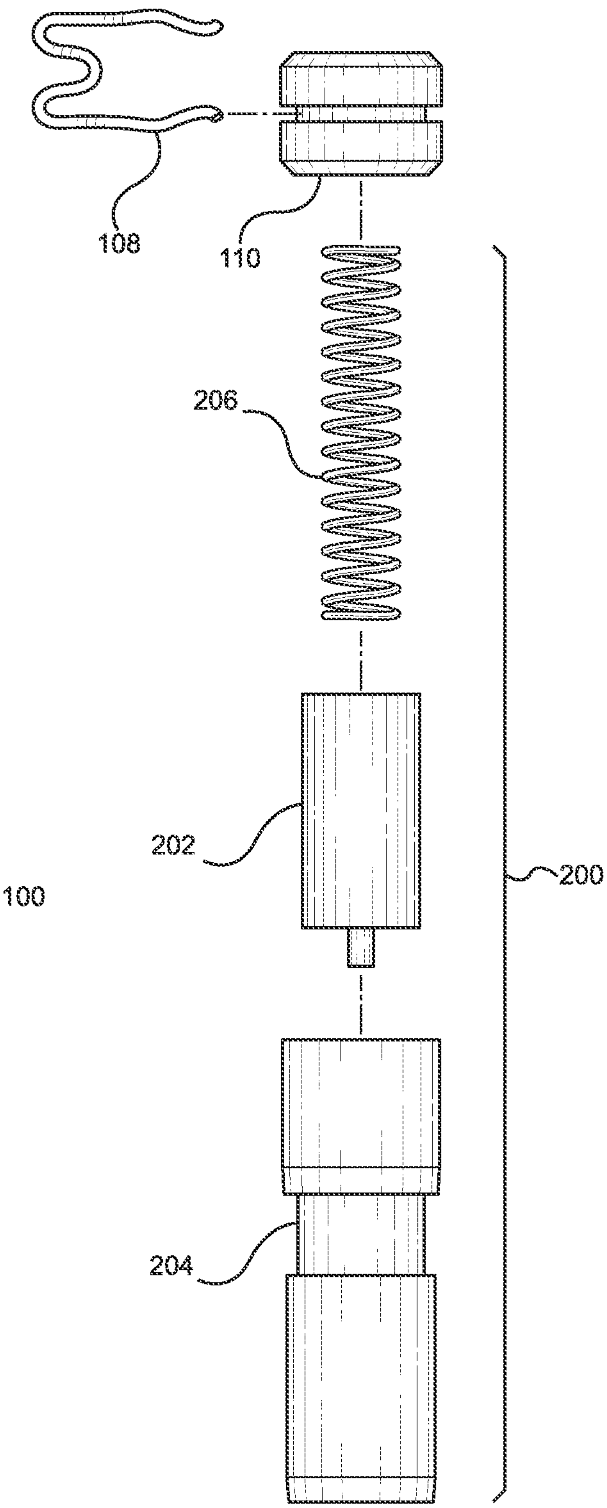
FIG. 2 shows a thermal control bypass valve embodiment of the present invention and constituent components designed for installation in a transmission pump.

FIG. 2 illustrates an embodiment of an improved thermal bypass valve 200 for installation in the transmission pump. A preferred embodiment of the thermal bypass valve 200 includes a blocker valve 204, a relief valve 202, and spring 206. The thermal bypass valve 200 reuses the valve plug 110 and clip 108 of the OEM thermostatic valve 100 in this embodiment. A new plug 110 and clip 108 may be provided in further embodiments, but reusing the plug and clip from the OEM valve saves on costs associated with converting the thermal cooling system according to embodiments of the current invention. The remaining components of the thermostatic valve 100, namely the upper portion 102, lower portion 104, and spring 106, are removed from the transmission oil pump and discarded or recycled.

Figure 3:
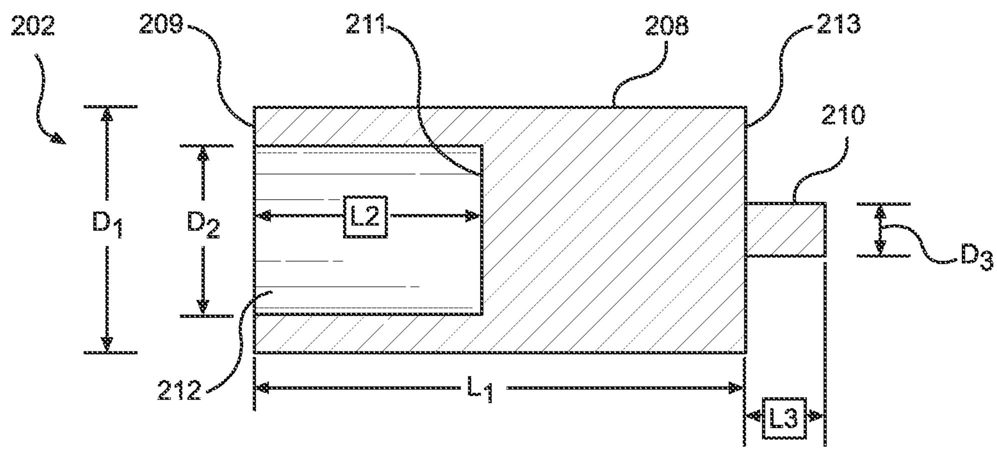
FIG. 3 shows a side view of a relief valve of the thermal control bypass valve embodiment, as provided in FIG. 2.
Figure 4:
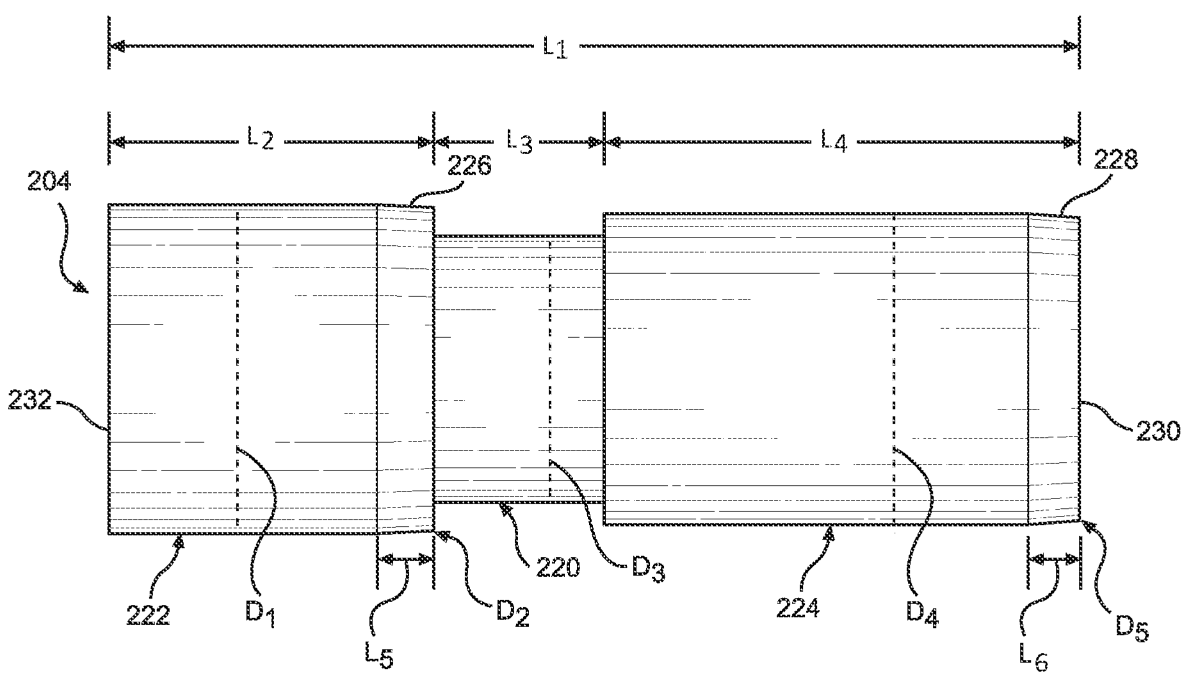
FIG. 4 shows a side view of a blocker valve of the thermal control bypass valve embodiment, as provided in FIG. 2.

FIGS. 3 and 4 provide descriptions and dimensions of the relief valve 202 and blocker valve 204. Dimensions provided for the valves 202 and 204 are preferred for a bypass valve 200 that is installed in the transmission pump of a Ford® 5R110W series transmission. The dimensions may be altered to conform to specific dimensions, if different, of other transmissions having the thermal element and corresponding thermal bypass valve in the transmission pump.

Referring now to FIG. 3, a side view of the relief valve 202 of the thermal bypass valve 200 is shown. The relief valve 202 includes a uniformly cylindrical body 208 having a length $L_1$ and a diameter $D_1$. In the preferred embodiment, $L_1$ is 24.13 mm (0.950") and $D_1$ is 12.085 mm+/−0.0508 mm (0.4758"+/−0.002"). A cylindrical cavity 212 having a uniform diameter $D_2$ extends within and along a partial length $L_2$ of the cylindrical body 208. The cavity 212 is contiguous with and open at a free end 209 of the cylindrical body 208 and is closed at an end 211 of the cavity opposite the free end. In the preferred embodiment, $L_2$ is 11.176 mm (0.440") and $D_2$ is 8.382 mm (0.330"). A cylindrical member 210, having a length $L_3$ and a diameter $D_3$, is coaxial with and extends away from the cylindrical body 208 along an end 213 of the cylindrical body opposite the free end 209. In the preferred embodiment, $L_3$ is 3.810 mm (0.150") and $D_3$ is 2.540 mm (0.100").

Referring now to FIG. 4, a side view of the cylindrical blocker valve 204 of the thermal bypass valve 200 is shown. The cylindrical blocker valve 204 includes a groove 220 having a length $L_3$ and a diameter $D_3$, In the preferred embodiment, $L_3$ is 5.334 mm (0.210") and $D_3$ is 10.033 mm (0.395"). The groove 220 defines an upper cylindrical portion 222 and a lower cylindrical portion 224 directly adjacent to and on either side of the groove. The upper cylindrical portion 222 has a length $L_2$ and a diameter $D_1$. In the preferred embodiment, $L_2$ is 12.700 mm (0.500") and $D_1$ is 12.073 mm+/−0.0508 mm (0.4753"+/−0.002"). A beveled edge 226 of the upper cylindrical portion 222 is adjacent to the groove 220, and has a length $L_5$, included within $L_2$, and decreases in diameter from $D_1$ to a diameter $D_2$, directly adjacent to the groove 220, In the preferred embodiment, $L_5$ is 2.159 mm (0.085") and $D_2$ is 11.303 mm (0.445"). The lower cylindrical portion 224 has a length $L_4$ and a diameter $D_4$, In the preferred embodiment, $L_4$ is 17.526 mm (0.690") and $D_4$ is 11.3157 mm+/−0.00508 mm (0.4455"+/−0.0002"). The lower cylindrical portion 224 also has a beveled edge 228 along a free end 230 of the lower cylindrical portion 224. The beveled edge 228 has a length $L_6$ and decreases from $D_4$ into a diameter $D_5$. In the preferred embodiment, $L_6$ is 2.159 mm (0.085") and $D_5$ is 10.541 mm (0.415"). The cylindrical blocker valve has an overall length $L_1$, which is the sum of $L_2$, $L_3$, and $L_4$, which is 35.56 mm (1.400") in the preferred embodiment.

Figure 5:
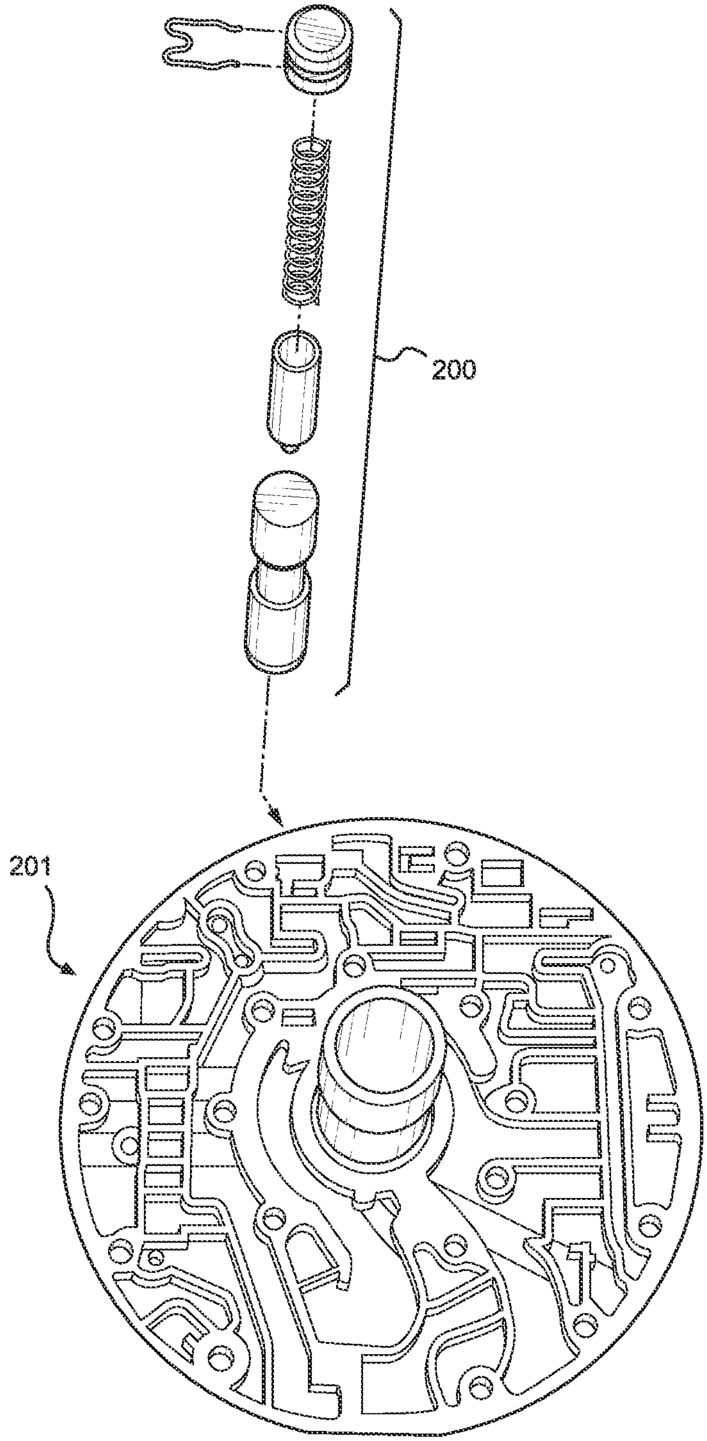
FIG. 5 shows installation of the thermal control bypass valve embodiment of FIG. 2 into a transmission pump.

FIG. 5 shows the thermal bypass valve 200 being inserted into a representative transmission oil pump 201. To install the preferred embodiment of the thermal bypass valve 200, the clip 108 is first removed from the valve plug 110. The valve plug 110 is then removed, and both the valve plug and clip 108 are saved. Next, the upper portion 102, lower portion 104, and spring 106 of the OEM thermostatic valve 100 are removed from the cooler flow control valve section of the oil pump 201. The upper portion 102, lower portion 104, and spring 106 of the OEM thermostatic valve 100 may then be discarded or recycled.

After discarding the OEM thermostatic valve 100, the thermal bypass valve 200 of the present invention may then be installed. First, the cylindrical blocker valve 204 is inserted into cooler flow control valve section of the oil pump 201 along the free end 230 of the lower cylindrical portion 224 having the beveled edge 228. The relief valve 202 is then inserted such that the cylindrical member 210 rests along a free end 232 of the upper cylindrical portion 222 of the blocker valve 204. The spring 206 is then inserted such that a portion of the spring's length is contained within the cylindrical cavity 212 of the relief valve 202. The spring 206 has a diameter that allows it to be secured within the cylindrical cavity 212 of the relief valve 202 without substantial lateral movement that would otherwise contribute to wearing of the cavity or misalignment of the valves 202 and 204 in the pump 201. The valve plug 110 is then once again secured to the oil pump 201 and is further secured by the clip 108 to keep the thermal bypass valve 200 in the oil pump.

Figure 24:
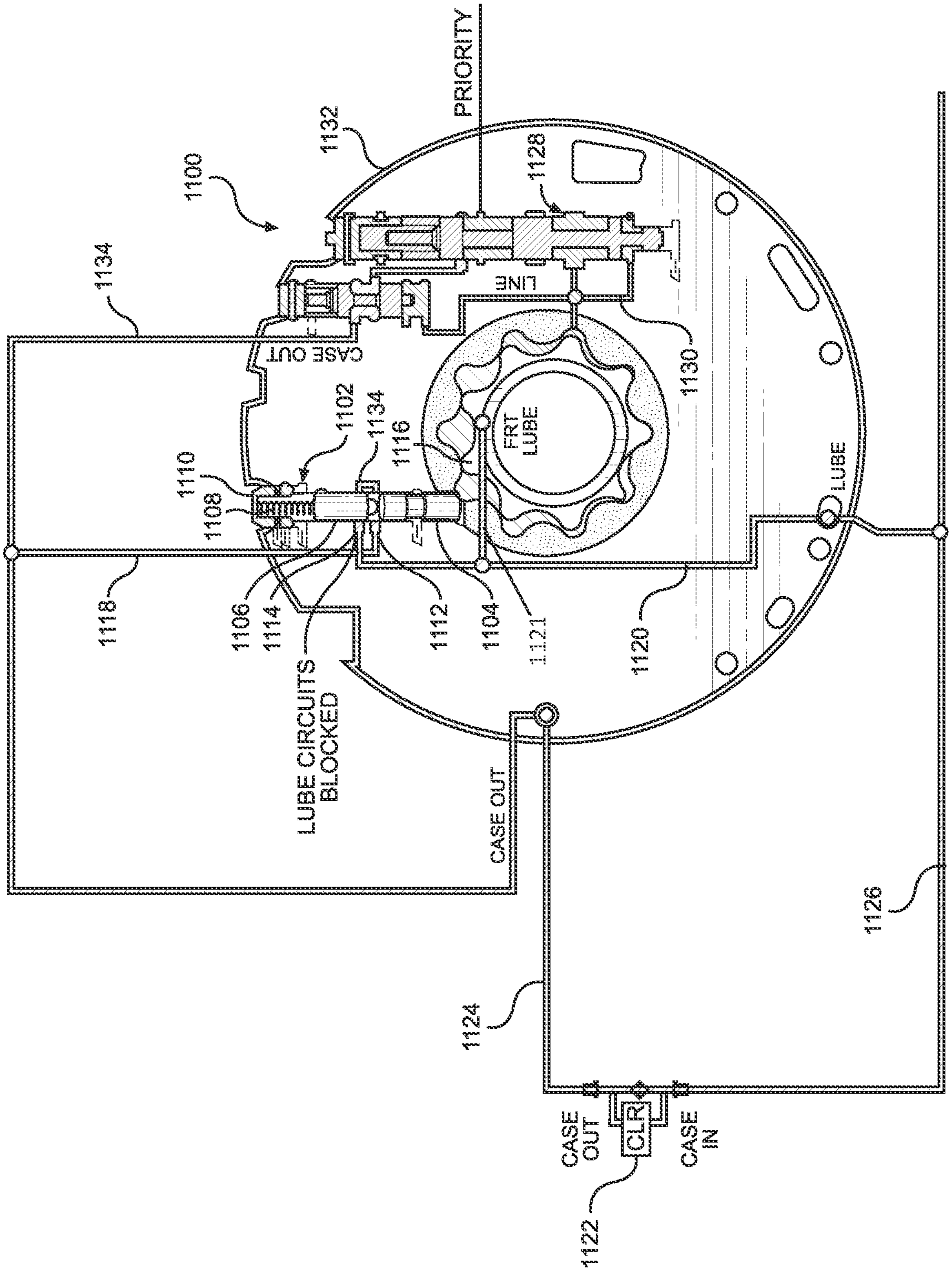
FIG. 24 shows an illustration of a fluid circuit through a transmission pump according to an embodiment of the present invention.

Further discussion of the cooler circuit of the thermal control system through the pump upon replacing the OEM valve 100 with the thermal bypass valve 200 or a similar embodiment is provided in reference to FIG. 24.

In a default state, or position at vehicle start-up, the relief valve 202 blocks a line connection path between the in-line and out-line through the thermal element. This forces cooler fluid to flow from other transmission systems to the cooler via the out-line and return from the cooler to the transmission systems via the in-line. If PSI within the fluid circuit of in-lines and out-lines reaches the blow-off PSI, the relief valve 202 is forced outward away from a center of the pump, towards the plug 110, and the spring 206 is compressed, thus allowing for cooler fluid flow through the line connection path and to include the thermal element in the fluid circuit to bypass flow to the cooler 1122. This scenario would occur if a blockage in the cooler 1122 prevents fluid flow through the cooler. When pressure decreases in the out-lines, forces on the relief valve 202 decrease and the spring 206 expands to push the relief valve back towards the blocker valve 204. This re-establishes flow from the pump and transmission to the cooler. The spring 206 is in a vented area between the relief valve 202 and plug 110, so there is no counterbalance oil pressure on the spring side of the relief valve. Therefore, the blow-off PSI is equal to the spring tension divided by the area of the end of the valve 202.

Figure 6:
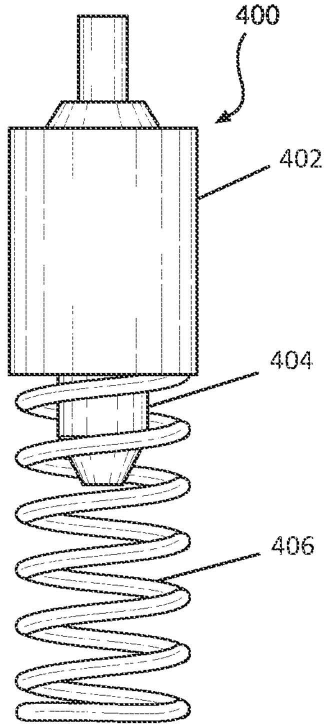
FIG. 6 shows a factory-original wax pellet style thermal control bypass valve for installation in a transmission case.

An OEM wax pellet style thermostatic valve 400 for insertion into a transmission case, or casing, is shown in FIG. 6. By way of example, the thermostatic valve of the Ford® 6R60, 6R75, and 6R80 series transmissions are housed in the transmission case and are typically used in Ford® Explorer models (6R60 series transmission), Ford® Expedition and Lincoln® Navigator models (6R75 series transmission), and Ford® Mustang and F150 models (6R80 series transmission). The OEM thermostatic valve 400 has sleeve 402, brass pellet 404, and spring 406, which are inserted into a transmission case or casing. As with the OEM thermostatic valve 100, the OEM thermostatic valve 400 defaults to a cooler flow OFF state.

Figure 7:
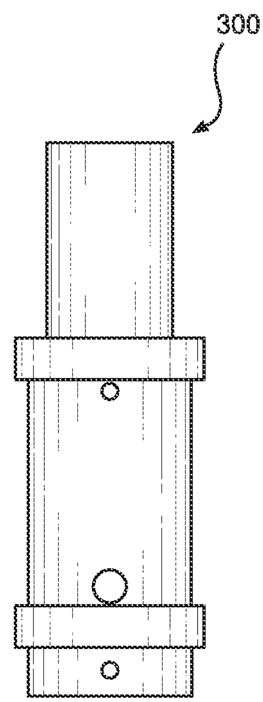
FIG. 7 shows a thermal control bypass valve embodiment of the present invention designed for installation in a transmission case.

FIG. 7 illustrates an embodiment of a thermal bypass valve 300 for insertion into a transmission casing. Dimensions for the thermal bypass valve 300 are provided by way of example to fit into the corresponding thermal element for the Ford® 6R60, 6R75, and 6R80 series transmissions to replace the OEM valve 400. However, the dimensions may be altered to fit within other transmissions having the thermal element located within the transmission case.

Figure 8:
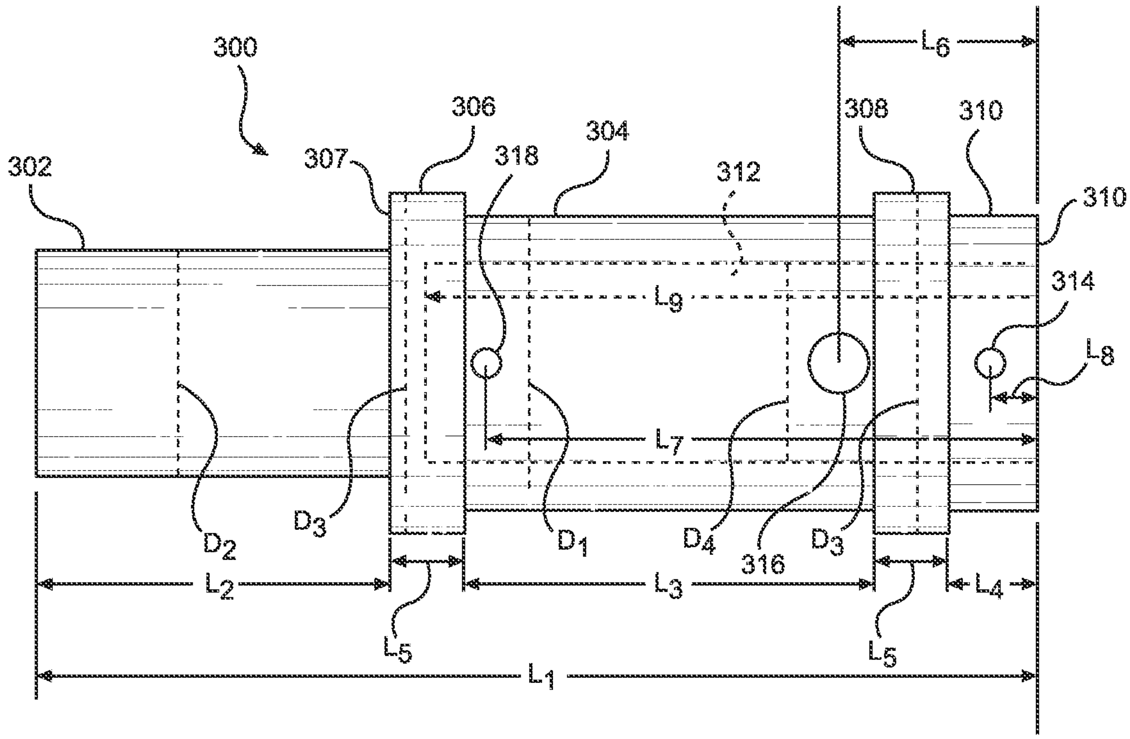
FIG. 8 shows a cross-sectional side view of the thermal control bypass valve embodiment, as shown in FIG. 7, without an inner spring and valve.

Referring now to FIG. 8, a side view of an embodiment of the thermal bypass valve 300 is provided. The thermal bypass valve 300 has a cylindrical body 304. The cylindrical body 304 has an inner cylindrical cavity 312 extending along a longitudinal length of the cylindrical body, the cylindrical body having a free end 310 contiguous with the cylindrical cavity, and along which the cylindrical cavity is open. The cylindrical cavity 312 has a length $L_9$ and a diameter $D_4$. In a preferred embodiment of the thermal bypass valve 300, $L_9$ is 31.75 mm (1.250") and $D_4$ is 10.01268 mm+/−0.00508 mm (0.3942"+/−0.0002"). A raised band 308 coaxially extends around a circumference of the cylindrical body 304 and is located proximate to the free end 310. A second raised band 306 coaxially extends around a circumference of the cylindrical body 304 along an end 307 opposite the free end 310. The raised band 308 and second raised band 306 have a length $L_5$ and a diameter $D_3$. In a preferred embodiment of the thermal bypass valve 300, $L_5$ is 3.81 mm (0.150") and $D_3$ is 17.28724 mm+/−0.00508 mm (0.6806"+/−0.0002"). A portion of the cylindrical body between the raised band 308 and second raised band has a length $L_3$ and a diameter $D_1$. In a preferred embodiment of the thermal bypass valve 300, $L_3$ is 21.082 mm (0.830") and $D_1$ is 14.732 mm (0.580"). Another portion of the cylindrical body 304 between the raised band 308 and free end 310 has a length $L_4$ and has the diameter $D_1$. In a preferred embodiment of the thermal bypass valve 300, $L_4$ is 4.318 mm (0.170"). A coaxial cylindrical protrusion 302 extends from the end 307 opposite the free end 310. The cylindrical protrusion 302 has a length $L_2$ and a diameter $D_2$. In a preferred embodiment of the thermal bypass valve 300, $L_2$ is 17.78 mm (0.700") and $D_2$ is 11.43 mm (0.450"). A relief opening 318 is provided in the cylindrical body 304 and is positioned between the raised band 308 and second raised band 306, and proximate to the second raised band. In a preferred embodiment of the thermal bypass valve 300, the relief opening 318 has a diameter of 1.5875 mm (0.0625") and a center of the relief opening is positioned 28.194 mm (1.110") away from the free end 310. A plurality of openings 316 are provided in the cylindrical body 304 between the raised band 308 and second raised band 306, and proximate to the raised band. In a preferred embodiment of the thermal bypass valve 300, each opening 316 has a diameter of 3.175 mm (0.125") and is positioned 9.906 mm (0.390") away from the free end 310. In a preferred embodiment of the thermal bypass valve 300, four openings 316 are provided proximate to the raised band and evenly spaced along the circumference of the cylindrical body 304. In a preferred embodiment of the thermal bypass valve 300, the entire length $L_1$ of the valve is 50.800 mm (2.000").

Figure 9:
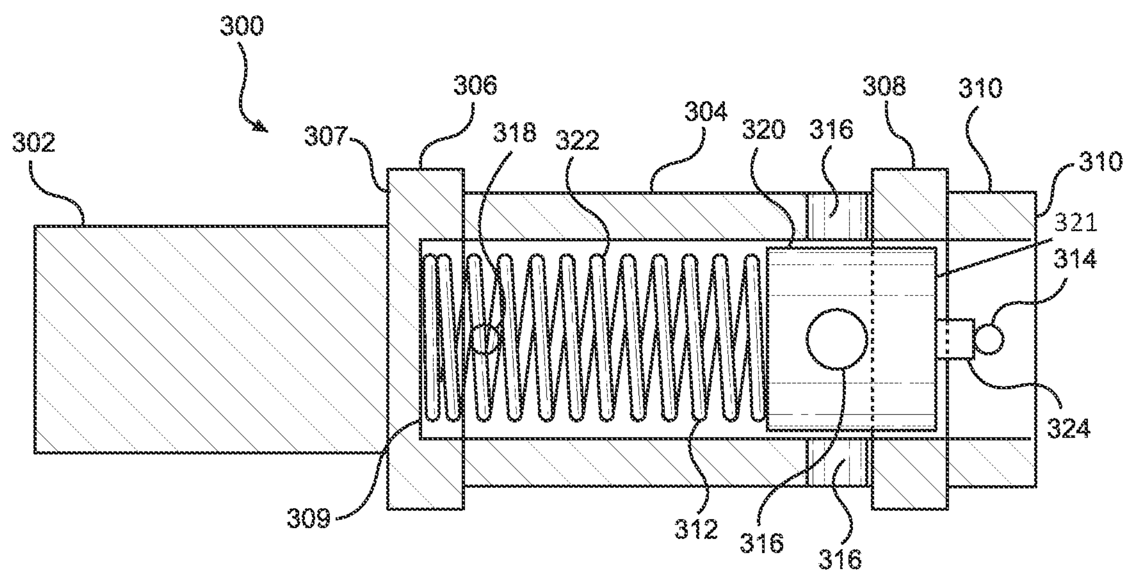
FIG. 9 shows a cross-sectional side view of the thermal control bypass valve embodiment, as shown in FIG. 7, with the inner spring and valve.

Referring now to FIG. 9, a side view of the preferred embodiment of the thermal bypass valve 300 is shown including a cylindrical relief valve 320 slidable within the cylindrical cavity 312. A spring 322 is also positioned within the cylindrical cavity 312 between the relief valve 320 and a closed end 309 of the cylindrical cavity. The relief valve 320 has a cylindrical member 324 coaxial with the relief valve and extending from a free end 321 of the relief valve. The spring 322 is semi-compressed within the cylindrical cavity 312 to keep the member 324 in contact with a tube 326 extending across the cavity. During operation, forces may act on the relief valve 320 forcing the relief valve to slide further toward the closed end 309 of the cavity 312, compressing the spring 322 further. When such forces are absent, the spring 322 expands to slide the relief valve 320 back to its relaxed, or default, position, with the member 324 in contact with the tube 326, once the counteracting forces are no longer present. The relief valve 320 and spring 322 are omitted from the view provided in FIG. 8 for the purpose of clearly showing the varying lengths and diameters of the various elements of the valve 300. FIG. 9 shows a view of the structures of the valve 300 within the cavity 312 omitted in FIG. 8.

Figure 10:
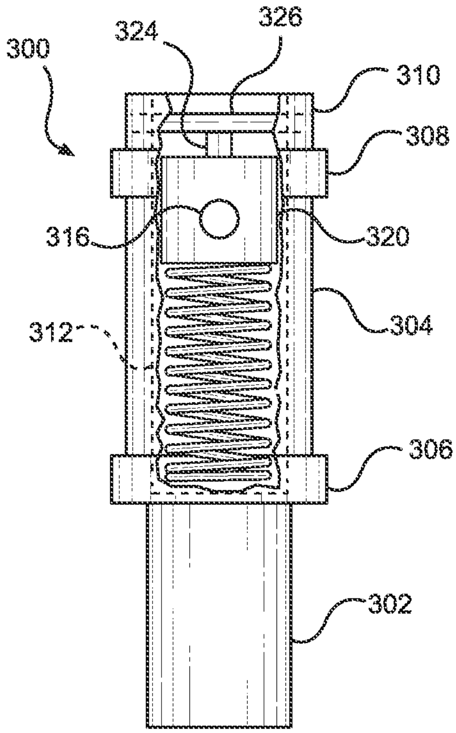
FIG. 10 shows a cross-sectional side view of the thermal control bypass valve embodiment rotated 90° along a longitudinal axis relative to the view of FIG. 9.

FIG. 10 provides a side view of the thermal bypass valve 300 rotated 90° relative to the view provided in FIGS. 8 and 9. The tube 326 extends across the cylindrical cavity 312 between the free end 310 and the raised band 308, and perpendicularly to the longitudinal length of the cylindrical body 304. The tube 326 extends within two holes 314 in the cylindrical body 304 proximate to the free end 310, and the two holes 314 are positioned 180° relative to each other along the circumference of the cylindrical body 304. In a preferred embodiment of the thermal bypass valve 300, each of the two holes 314 are 1.5875 mm (0.0625") in diameter and a center of each hole is positioned 2.032 mm (0.080") from the free end 310. Further, the tube is preferably hollow such that the two holes 314 and tube 326 form an enclosed cylindrical space across the cylindrical cavity 312. However, the tube 326 may be solid in other embodiments of the valve 300. A view from the opposite side of the valve 300 mirrors the view shown in FIG. 10

Figure 11:
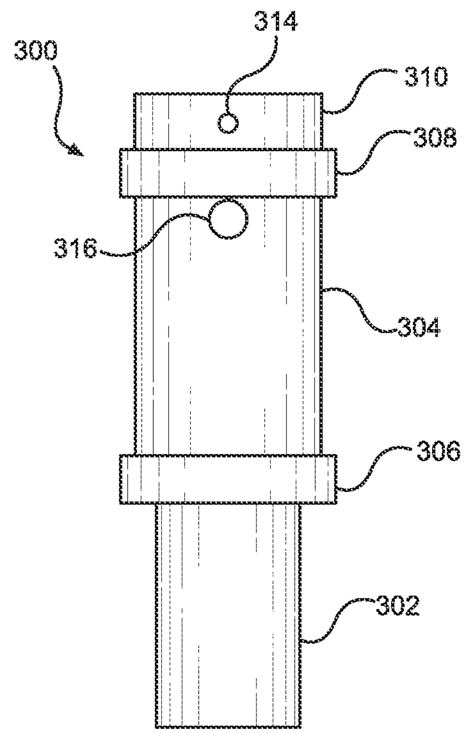
FIG. 11 shows a side view of the thermal control bypass valve embodiment rotated 180° along a longitudinal axis relative to the view of FIG. 9, and without a cross-sectional view.

FIG. 11 provides a side view of the thermal bypass valve 300 rotated 180° relative to the view provided in FIGS. 8 and 9. In this view, one of the two holes 314 is shown, along with an opening of the plurality of openings 316. As there is only one relief opening 318, and it is on the opposite side of the cylindrical body 304, another relief opening is not shown.

Figure 12:
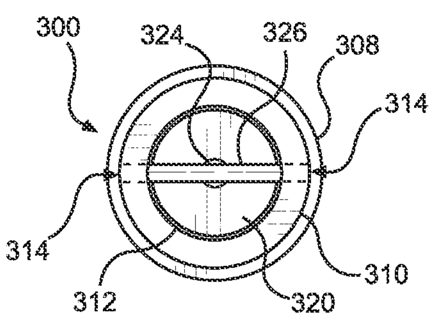
FIG. 12 shows a bottom view of the thermal control bypass valve embodiment of FIG. 7.

FIG. 12 shows a bottom view of the thermal bypass valve 300 provided in FIGS. 8 and 9. The raised band 308 sets the outer most diameter of the valve 300, along with the second raised band 306. The two holes 314 and tube 326 are shown from a better view. The member 324 of the relief valve 320 rests against the tube 326, keeping the relief valve within the cylindrical cavity 314.

Figure 13:
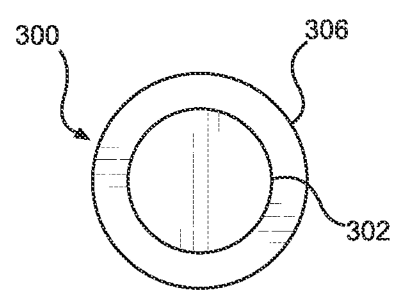
FIG. 13 shows a top view of the thermal control bypass valve embodiment of FIG. 7.

FIG. 13 shows a top view of the thermal bypass valve 300 provided in FIGS. 8 and 9. This view would be seen by a user upon installing the valve 300 into the transmission casing. The second raised band 306, along with the raised band 308, sets the outer most diameter for the thermal bypass valve 300. The cylindrical protrusion 302 is shown having a smaller diameter than the second raised band 306, and the remaining elements are obscured in this view.

Figure 14:
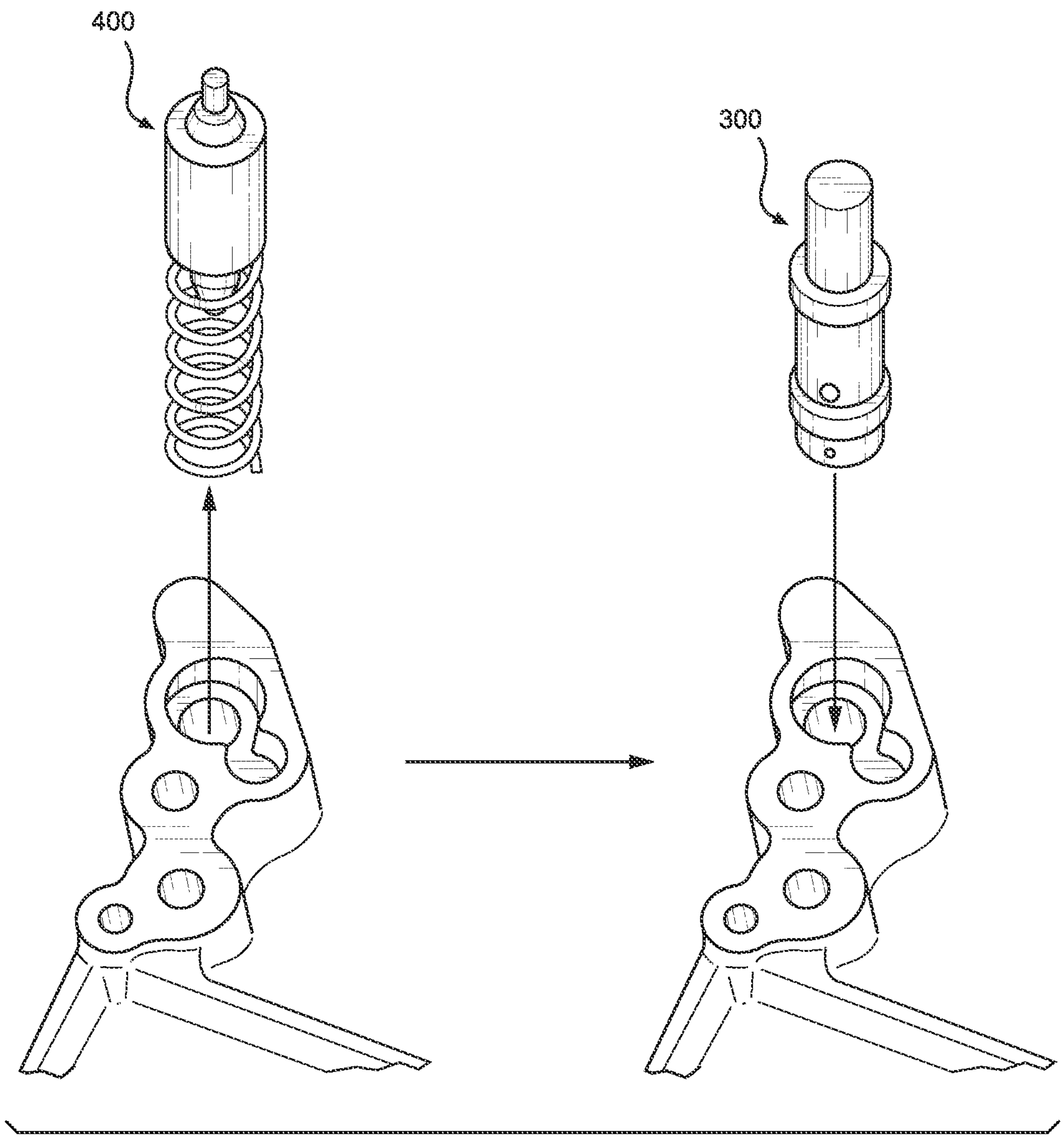
FIG. 14 shows removal of the factory-original wax pellet style thermal control bypass valve of FIG. 6 from a transmission case and replacement with the thermal control bypass valve embodiment of FIG. 7.

FIG. 14 demonstrates how the thermal bypass valve 300 replaces the OEM thermostatic valve 400 in transmissions having the thermal element in the transmission casing. After locating the thermostatic valve opening on the transmission case, the OEM thermostatic valve 400 is removed, including the sleeve, wax pellet, and spring. The OEM thermostatic valve 400 may then be discarded or recycled. The thermal bypass valve is then inserted into the thermostatic valve opening, such that the free 310 is inserted first and the cylindrical protrusion 302 is still visible after insertion.

In operation, the free end 310 of the valve 300 would be inserted into an opening between a thermal element chamber and an out-line leading fluid from the transmission to the cooler. Alternately, the valve sits in the thermal element chamber such that the raised band 308 creates a seal between a connection point of the in-line and out-line, such that fluid must flow from the out-line through free end 310 and through the cavity 312 to reach the in-line. In the default position, shown in FIG. 9, the relief valve 320 blocks access to the thermal element chamber and in-line from the out-line, preventing cooler bypass, and forcing fluid to travel from the transmission through the out-line to the cooler and back to the transmission via the in-line, thereby ensuring cool fluid return to the transmission. Under high pressure in the out-line, such as when a blockage in the cooler prevents flow out through the in-line, forces on the relief valve 320 compress the spring 322 moving the relief valve into the cavity and toward end 309. Once the spring 322 is compressed far enough, openings of the plurality of openings 316 allow fluid to exit the cavity 322 and enter the in-line to the transmission. This allows the fluid to bypass the cooler. Relief opening 318 allows fluid and/or air to escape or enter the cavity 312 between the relief valve 320 and end 309 during compression or expansion of the spring 322. Raised band 306 forms the outer diameter and seal between the thermal element chamber, in-line, and external environment, closing the fluid circuit at the thermal element location.

Figure 15:
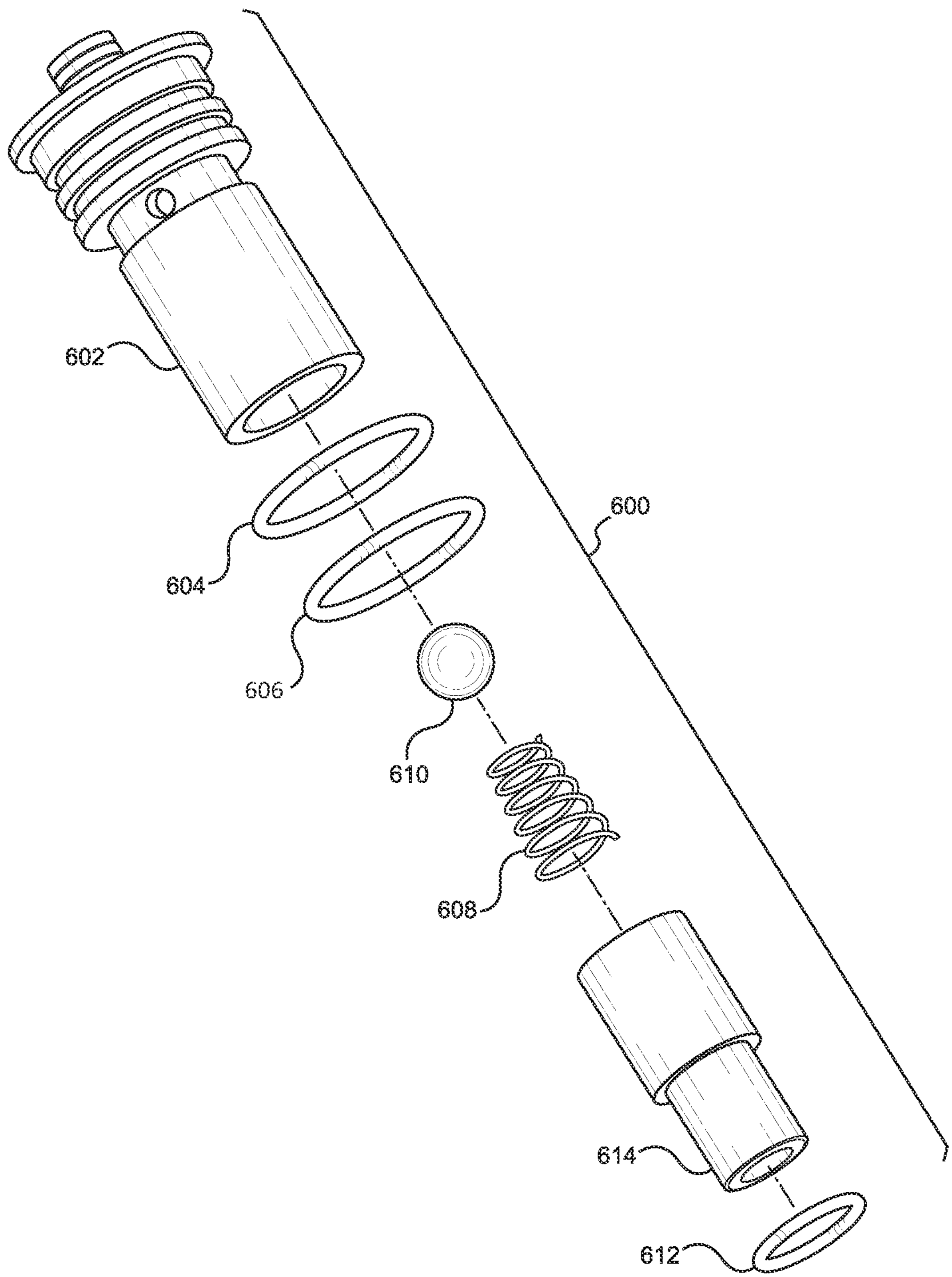
FIG. 15 shows a thermal control bypass valve embodiment of the present invention designed for installation in a thermal element block in cooler lines.

An embodiment of a thermal bypass valve 600 for transmissions having a thermal element external to the transmission, in either a block in the cooler in-line and out-line or in the cooler itself, is shown in FIG. 15. Dimensions provided in referenced to the valve 600 pertain specifically to an improved valve fitting into an external thermostat block of the Ford® 6R80E series transmission, model year 2014 and up, that is removably attached to an outside of the transmission case. However, the dimensions of the valve may be changed to fit other transmissions having the thermal element within the cooler or external blocks in the cooler line.

FIG. 15 shows the individual components of the thermal bypass valve 600 that fit into the external thermostat block after removal of the OEM thermostatic valve, including a sleeve 602, two O-rings 604 and 606, a conical spring 608, a bearing ball 610, a piston 614, and a piston O-ring 612. Further discussion of these components is provided below.

Figure 16A:
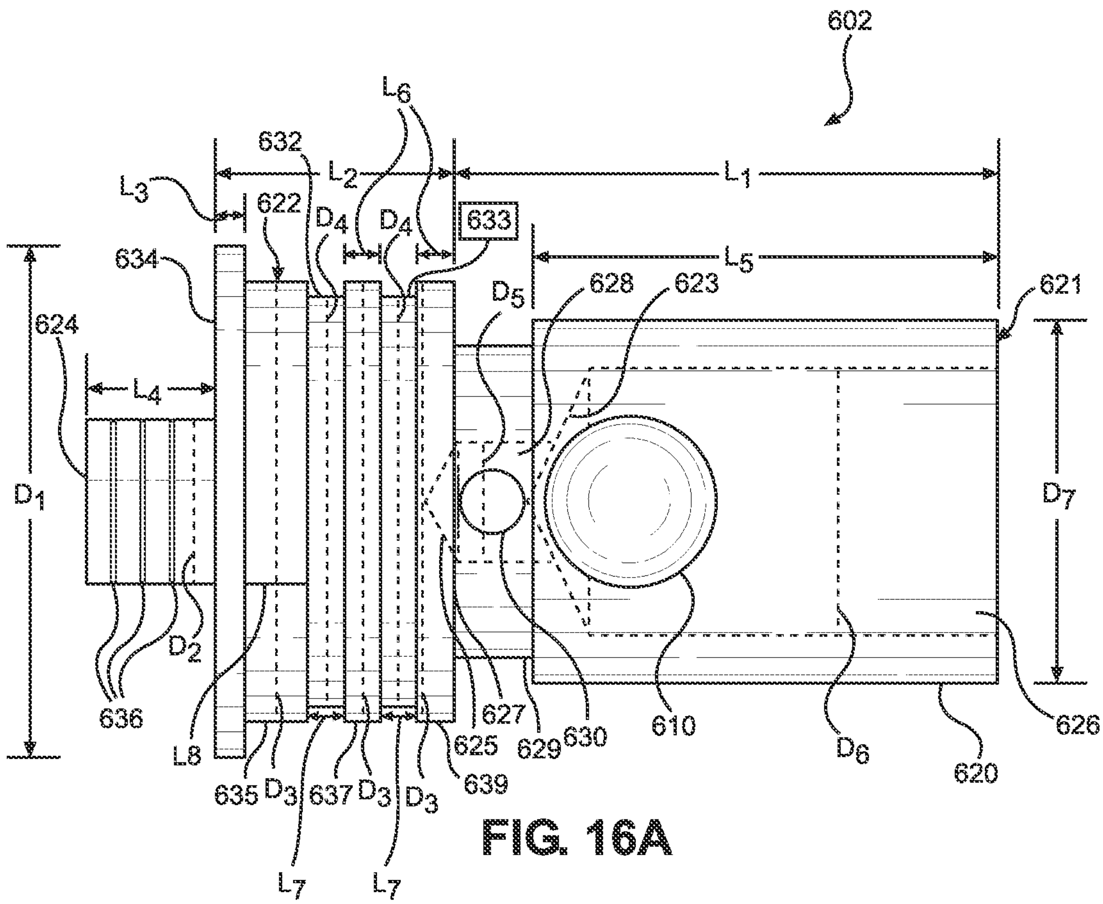
FIG. 16A shows a cross-sectional side view of a sleeve and ball of the thermal control bypass valve embodiment of FIG. 15.

Referring now to FIG. 16A, the sleeve 602 of the thermal bypass valve 600 is shown in greater detail, along with the bearing ball 610. The sleeve 602 has a cylindrical body 620 with a cylindrical cavity 626 extending along a longitudinal length of the cylindrical body. The cylindrical cavity 626 is contiguous with and open along a free end 621 of the cylindrical body 620. An opposite inner end 623 of the cylindrical cavity 626 is beveled toward a second cylindrical cavity 628, which in turn is contiguous with the beveled inner end 623 of the cylindrical cavity 626. The beveled inner end 623 is preferred, although not necessary, with use with a bearing ball 610. The beveled end 623 helps to ensure that the bearing ball 623 sits fully within the opening between the cylindrical cavities 626 and 628 between expansion and contraction of the spring 608. A squared end runs the risk of the bearing ball 610 getting caught between the spring 608 and end 623 without fully blocking fluid access to the cylindrical cavity 626. The beveled edge ensures that, even in the event of a misalignment, the bearing ball 610 returns to fully sit within the opening between the cavities 626 and 628 to prevent and/or restrict fluid flow to the cylindrical cavity 626.

The second cylindrical cavity 628 has a smaller diameter and length than the cylindrical cavity 626. A closed end 625 of the second cylindrical cavity is pitched toward a grooved blocker portion 622 of the sleeve 602. The cylindrical body 620 has a groove 629 extending around an outer circumference of the cylindrical body 620 along an end 627 opposite the free end 621. A plurality of openings 630 in the groove 629 lead into the second cylindrical cavity 628. The cylindrical body 620, including the groove 629, has a length $L_1$. In a preferred embodiment of the valve 600, $L_1$ is 26.543 mm (1.045"). The cylindrical body 620, not including the groove 629, has a length $L_5$. In a preferred embodiment of the valve 600, $L_5$ is 23.241 mm (0.915"). The cylindrical body 620 has a diameter $D_7$. In a preferred embodiment of the valve 600, $D_7$ is 18.4658 mm (0.727"). The cylindrical cavity 626 has a diameter $D_6$. In a preferred embodiment of the valve 600, $D_6$ is 18.4658 mm (0.5469"). The second cylindrical cavity 628 has a diameter $D_5$. In a preferred embodiment of the valve 600, $D_5$ is 6.9088 mm (0.272"). Each of openings of the plurality of openings 630 has a diameter of 3.175 mm (0.125"). In a preferred embodiment of the valve 600, there are four openings 630 spaced equidistantly around the circumference of the groove 629. There is a 0.127 mm (0.005") clearance between each opening of the plurality of openings 630 and the grooved blocker portion 622.

Still referring to FIG. 16A, the grooved blocker portion 622 of the sleeve 602 is contiguous at an end with the groove 629 and end 627 of the cylindrical body 620. The grooved blocker portion 622 is itself cylindrical and has two grooves 632 and 633. The grooves 632 and 633 are evenly spaced relative to each other about the circumference of the grooved blocker portion 622. A cap 634 is attached to the grooved blocker portion along an end opposite the cylindrical body 620. In use, the cap 634 seals the cooler and other components of the thermal bypass valve 600 within the external thermostat block. A cylindrical member 624 is attached to the cap on an end opposite the grooved blocker portion. The member 624 may be grooved itself to aid in removing the sleeve 602 from the external thermostat block. The cylindrical member 624, cap 634, grooved blocker portion 622, grooves 632 and 633, groove 629, cylindrical body 620, cylindrical cavity 626, and second cylindrical cavity 628 are all coaxial and share a central longitudinal axis extending through the center of the sleeve 602 lengthwise. The grooved blocker portion 622 and cap 634 together have a length $L_2$. In a preferred embodiment of the valve 600, $L_2$ is 11.557 mm (0.455"). Each groove 632 and 633 have a length $L_7$ and a diameter $D_4$. In a preferred embodiment of the valve 600, $L_7$ is 1.9558 mm (0.077") and $D_4$ is 19.3802 mm+/−0.0254 mm (0.763"+/−0.001". Lands 635, 637, and 639 of the grooved blocker portion 622 have a diameter $D_3$. In a preferred embodiment of the valve 600, $D_3$ is 21.844 mm (0.860"). Lands 637 and 639 have a length $L_6$. In a preferred embodiment of the valve 600, $L_6$ is 1.524 mm (0.060"). Land 635 has a length $L_8$. In a preferred embodiment of the valve 600, $L_8$ is 3.1242 mm (0.123"). The cap 634 has a length $L_3$ and a diameter $D_1$. In a preferred embodiment of the valve 600, $L_3$ is 1.4732 mm (0.058") and $D_1$ is 25.4 mm (1.000"). The member 624 has a length $L_4$ and a diameter $D_2$. In a preferred embodiment of the valve 600, $L_4$ is 7.62 mm (0.300") and $D_2$ is 8.255 mm (0.325").

Figure 16B:
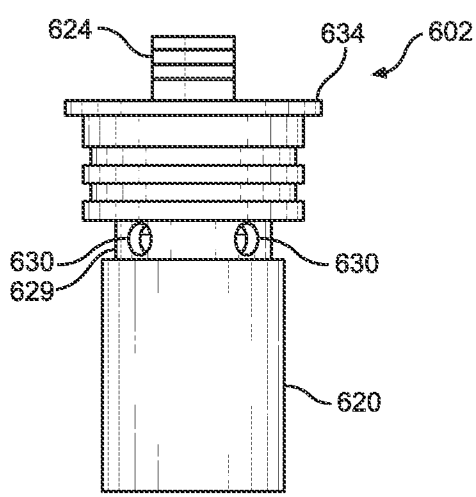
FIG. 16B shows a side view of the sleeve of FIG. 16A rotated 45° along a central longitudinal axis.

FIG. 16B shows a rotated view of the sleeve 602 to illustrate the plurality of openings 630 in the groove 629. A view from the opposite side of the sleeve 602 mirrors the view shown in FIG. 16B in the preferred embodiment.

Figure 17:
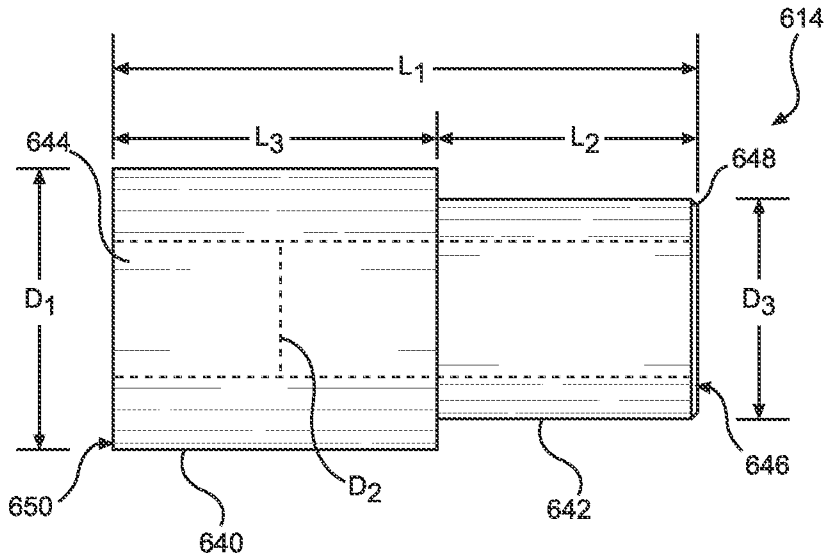
FIG. 17 shows a cross-sectional side view of a sleeve of the thermal control bypass valve embodiment of FIG. 15.

Referring now to FIG. 17, a side view of the piston 614 is provided. The piston 614 has a first cylindrical portion 640 adjacent to and continuous with a second cylindrical portion 642. A central cylindrical cavity 644 extends through both the first and second cylindrical portions 640 and 642, and the cylindrical cavity, first cylindrical portion, and second cylindrical portion are coaxial. A free end 646 of the second cylindrical portion 642 may have an outer edge 648 that is beveled. The cavity 644 is open along the free end 646 and an opposing free end 650 along the first cylindrical portion 640. The piston has a length $L_1$. In a preferred embodiment of the valve 600, $L_1$ is 28.448 mm (1.120"). The first cylindrical portion has a length $L_3$ and a diameter $D_1$. In a preferred embodiment of the valve 600, $L_3$ is 15.748 mm (0.620") and $D_1$ is 13.8684 mm (0.546"). The second cylindrical portion has a length L2 and a diameter D3. In a preferred embodiment of the valve 600, $L_2$ is 12.7 mm (0.500") and $D_3$ is 10.8458 mm (0.427"). The cylindrical cavity has length $L_1$ and a diameter $D_2$. In a preferred embodiment of the valve 600, $D_2$ is 6.9088 mm (0.272"). The beveled outer edge 648 has a length of 0.762 mm (0.030") in a preferred embodiment.

Figure 18:
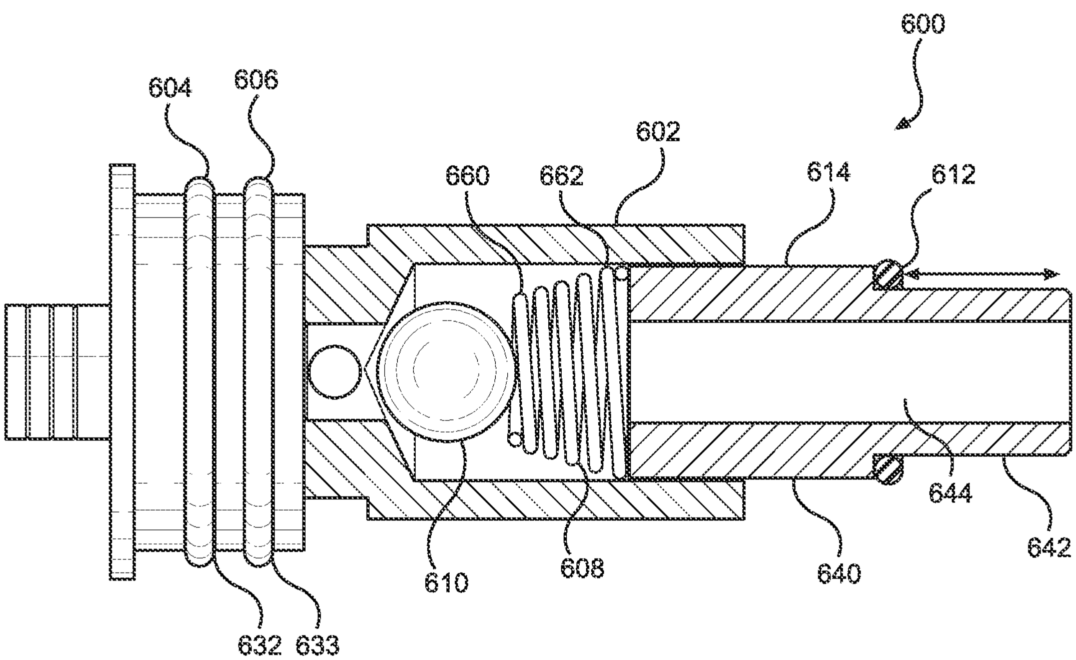
FIG. 18 shows a cross-sectional side view of the thermal control bypass valve embodiment of FIG. 15 with constituent parts operably assembled together.

Referring now to FIG. 18, the thermal bypass valve 600 and constituent components are shown and arranged for insertion into, and operation within, the external thermostat block. O-ring 604 is slipped over the sleeve 602 and secured within the groove 632 and O-ring 606 is slipped over the sleeve and secured within the groove 633. The bearing ball 610 is inserted within the cylindrical cavity 626 of the cylindrical body 620 of the sleeve 602. The conical spring 608 is then inserted into the cylindrical cavity 626 such that the smaller diameter end 660 is positioned around a surface of the bearing ball 610. A larger diameter end 662 of the conical spring 608 is positioned against the free end 650 of the first cylindrical portion 640 of the piston 614, which is also partially inserted into the cylindrical cavity 626 of the sleeve 602. The piston O-ring 612 is secured around the second cylindrical portion 642 of the piston 614 adjacent to the first cylindrical portion 640. The piston 614 and conical spring 608 keep the bearing ball 610 secured within an opening formed at the juncture of the second cylindrical cavity 628 and beveled end 623 of the cylindrical cavity 626 of the sleeve 602. In a preferred embodiment of the valve 600, the bearing ball has a diameter of 8.5 mm (0.335").

In operation, fluid traveling through the out-line from the transmission to the cooler either passes through valve 600 via the plurality of openings 630 and second cylindrical cavity 628 and/or around the valve along the groove 629 to continue towards the cooler. This is a default position of the valve 600, whereby fluid is allowed to flow from the transmission to the cooler and back again to supply cooled fluid to the transmission. The bearing ball 610 blocks access to the first cylindrical cavity 626 in the default position, as the spring 608 holds the bearing ball 610 in contact with an inner circumferential edge of the beveled inner end 623 shared by the second cylindrical cavity 628. The O-rings 604 and 606 provide sealing edges that keep fluid from escaping through an opening in the thermostatic block through which the valve 600 is installed. When pressure builds up in the out-line, due for example to a blockage in the cooler preventing fluid flow from the cooler to the transmission via the in-line, forces act on the bearing ball 610 to compress spring 608. This in turn opens a passage from the second cylindrical cavity 628 to the first cylindrical cavity 626 and allows fluid to bypass the cooler. Fluid then flows from the out-line through the plurality of openings 630, into the second cylindrical opening, around the bearing ball 610, past the spring 608 through gaps in spring coils, through the cavity 644 of the piston 614 and out of the valve 600 and into the in-line. Once pressure eases in the out-line, the spring 608 expands, forcing the bearing ball 610 to once again seal the connection point between the first and second cylindrical cavities 626 and 628. The piston 614 slidably engages the cylindrical cavity 626 of the sleeve 626 along at least a partial length of the first cylindrical portion 640 such that fluid cannot escape the sleeve between the sleeve and piston in the cylindrical cavity. The O-ring 612 helps to ensure that fluid does not travel around an outer surface of the piston 614 and must pass through cavities 626, 628, and 644 of the valve 600 in order to bypass the cooler. The piston 614 does not move relative to the sleeve 602 during normal operation of the transmission and thermal control system.

Figure 19:
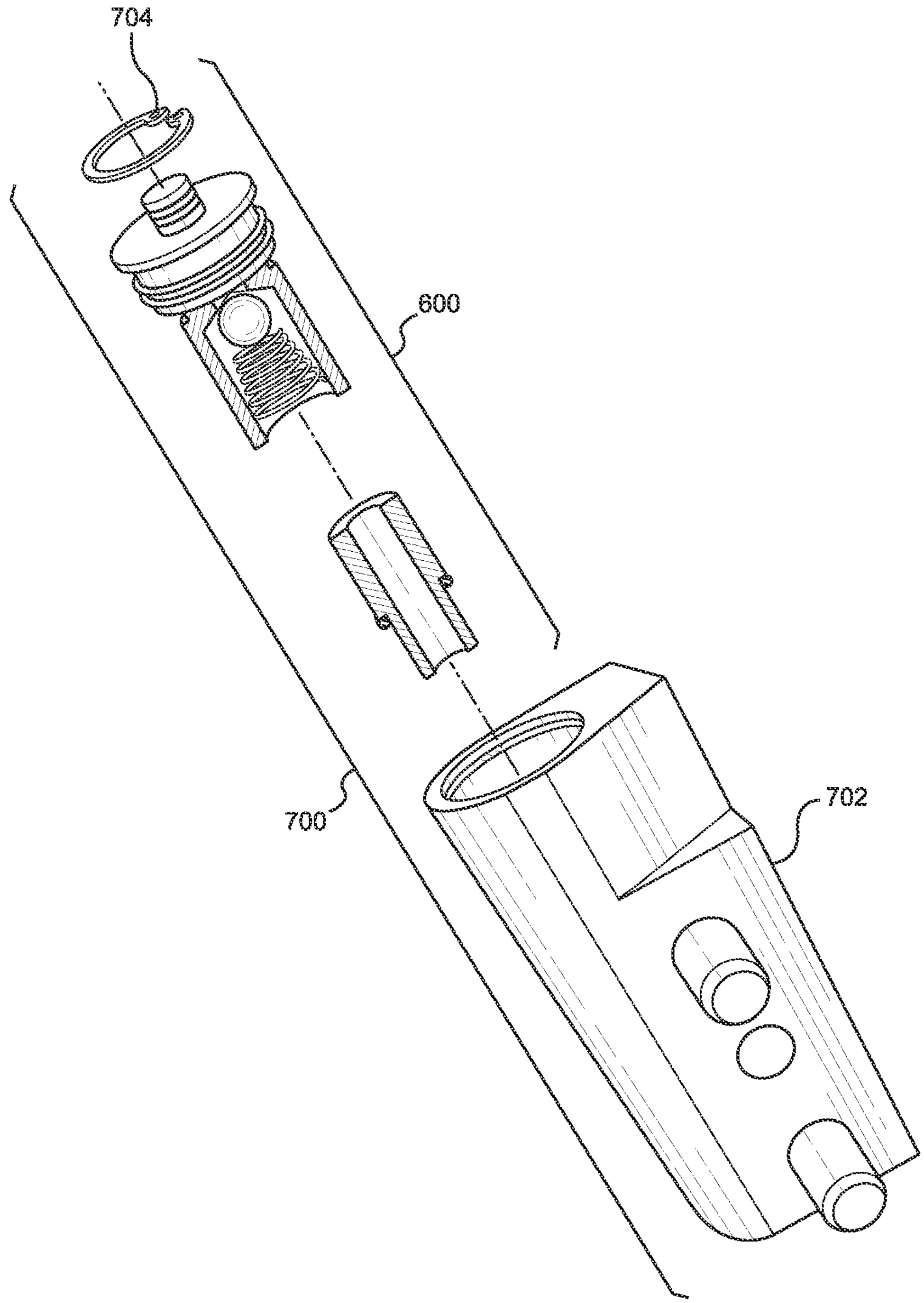
FIG. 19 shows installation of the thermal control bypass valve embodiment of FIG. 15 into factory-original thermal element block.

Referring now to FIG. 19, the thermal bypass valve 600 is inserted into the external thermostat block 702 after the OEM thermostatic valve is removed and discarded or recycled. The second cylindrical portion 642 of the piston 614 is inserted into a recessed portion of the external thermostat block 702, along with the piston O-ring 612, and the sleeve 602, two O-rings 604 and 606, conical spring 608, and bearing ball 610 are inserted into the external thermostat block such that the valve 600 is contained within the block 702 as shown in FIG. 18. An OEM snap ring 704 is saved from the OEM thermostatic valve and used to secure the sleeve 602 and remaining components of the valve 600 in place. Together, the thermal bypass valve 600, OEM snap ring 704, and external thermostatic block 702 form an improved thermal control system 700.

Figure 25:
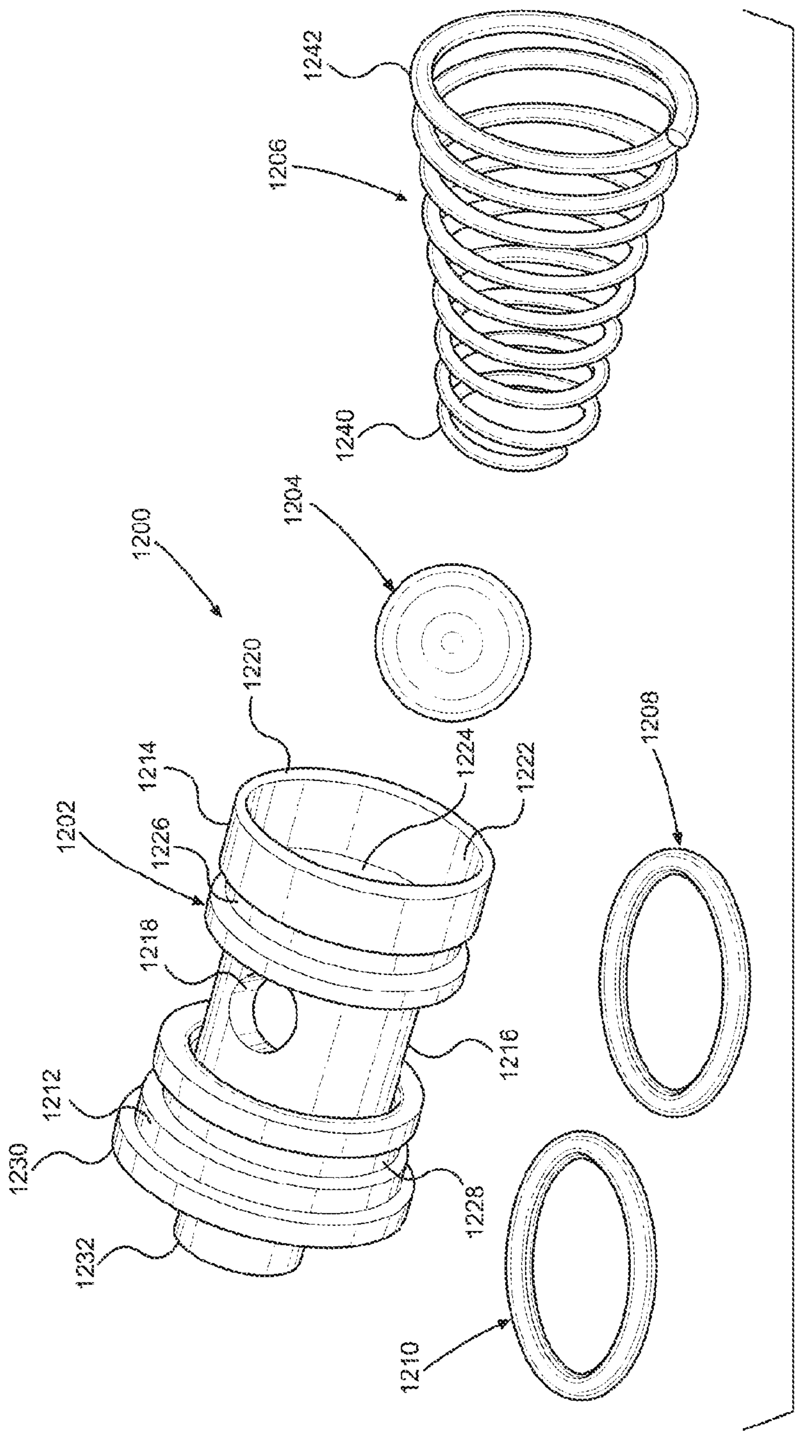
FIG. 25 shows a thermal control bypass valve embodiment of the present invention designed for installation in a thermal element located in the cooler.
Figure 26A:
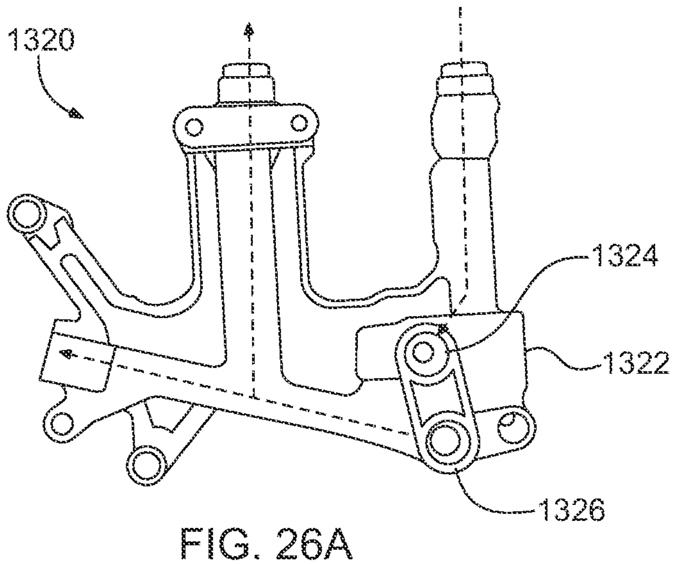
FIG. 26A is a side view of a transmission with arrows showing transmission fluid flow.
Figure 26B:
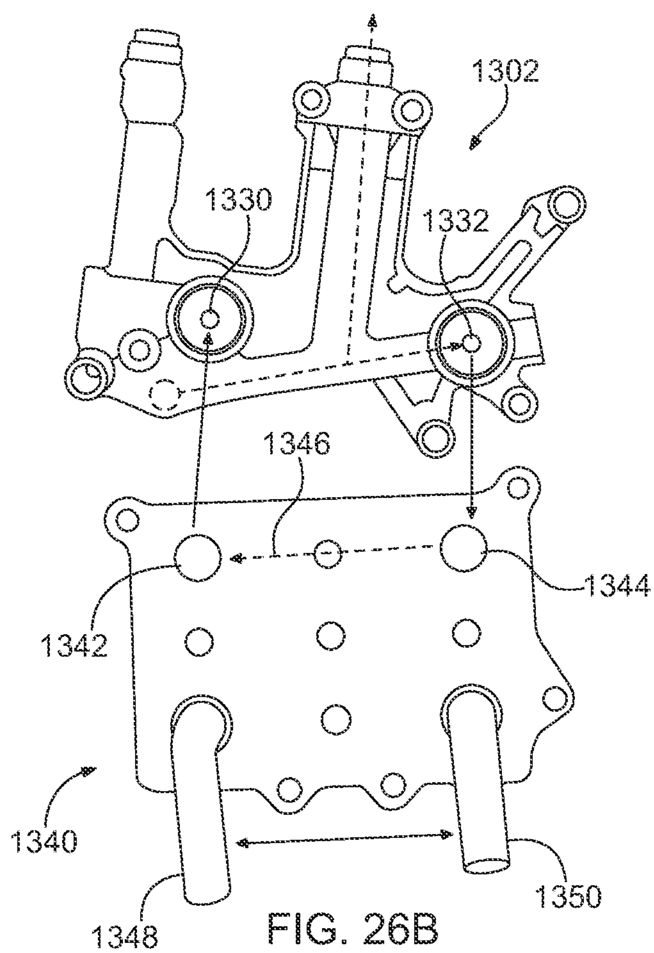
FIG. 26B is an opposite side view of the transmission shown in FIG. 26A along with an engine coolant warmer that is attached to the transmission along corresponding openings.
Figure 26C:
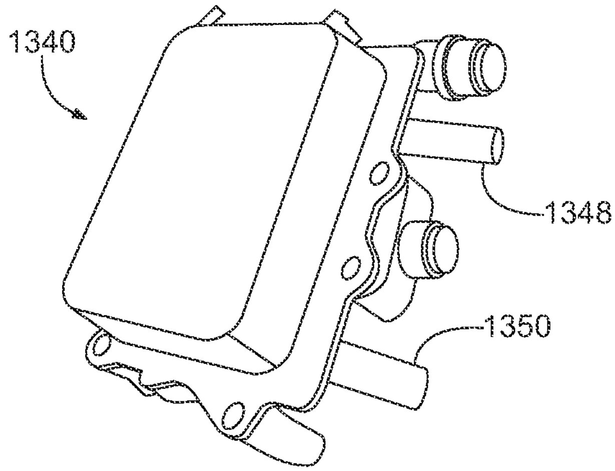
FIG. 26C is a perspective view of the engine coolant warmer shown in FIG. 26B.
Figure 26D:
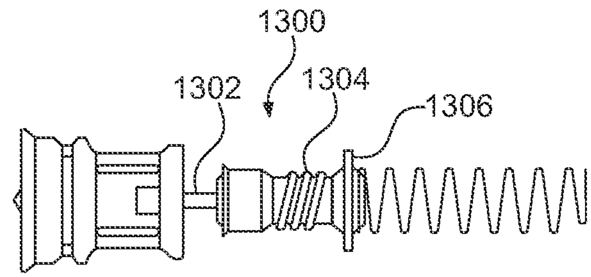
FIG. 26D is a side view of a prior art OEM thermal bypass device corresponding to the transmission of FIG. 26A.
Figure 26E:
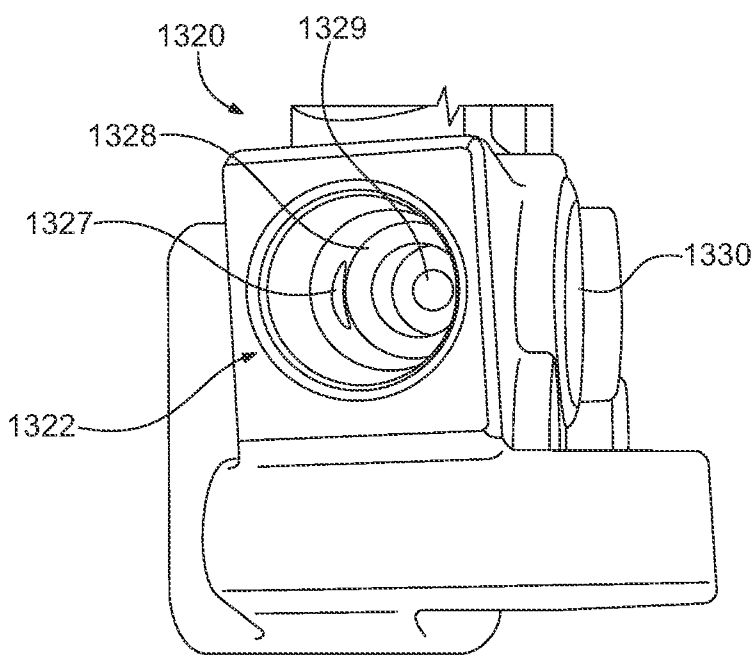
FIG. 26E is a front view of the transmission shown in FIG. 26A showing an opening corresponding to installation of the prior art OEM thermal bypass device of FIG. 26E.

Referring to FIG. 25, an alternative embodiment of a thermal control bypass valve 1200 is shown. This valve 1200 is designed to be inserted into a thermal element located within the cooler itself. The valve 1200 shares similar structures with the valve 600 configured to be inserted into a thermal element located in the cooler lines.

A sleeve 1202 of the valve 1200 has an upper cylindrical portion 1212 and a lower cylindrical portion 1214 defined by a groove 1216 extending there between. The groove 1216 extends around a circumference of the valve 1200 and has a smaller diameter than either the upper cylindrical portion 1212 or the lower cylindrical portion 1214. An inner cavity 1224 extends within an interior of the valve 1200, with one of the inner cavity 1224 being closed and another end of the cavity open along a beveled edge 1222 increasing in diameter toward a free end 1220 of the valve 1200. The beveled edge 1222 is adjacent to and contiguous with the inner cavity 1224 and the free end 1220 of the valve 1200. At least one opening 1218 in the groove 1216 opens into the inner cavity 1224, providing fluid access through at least two different openings in the valve 1200. Two or more openings are preferred in the groove 1216, to allow fluid access laterally through the valve 1200 by fluid traveling through the out-line, and to allow sufficient amounts of fluid into the inner cavity 1224 and through the free end 1220 during bypass. A first narrow groove 1228 extends around a circumference of the upper cylindrical portion 1212, and a second narrow groove 1226 extends around a circumference of the lower cylindrical portion 1214. These grooves 1226 and 1228 are wide enough to securely accommodate and hold O-rings 1208 and 1210, respectively, which have identical dimensions. A bearing ball 1204 is held partially within the inner cavity 1224 and an area created by a circumference and width of the beveled edge 1222 by a conical spring 1206. The conical spring 1206 engages the bearing ball 1204 about its surface along a small-diameter end 1240 of the spring. A large-diameter end 1242 of the spring 1206 supports the spring against an inner surface of the thermal element and provides an immovable support upon which the spring compresses during fluid bypass of the cooler.

The beveled end 1222 helps to ensure that the bearing ball 1204 fully closes the opening to the inner cavity 1224 along the free end 1220 of the valve 1200. As with the valve 600 in previous embodiments, a squared end runs the risk of the bearing ball 1204 getting caught between the spring 1206 and end 1220 without fully blocking fluid access to the inner cavity 1224. The beveled edge 1222 ensures that, even in the event of a misalignment, the bearing ball 1204 returns to fully sit within the opening at the free end 1220 to prevent and/or restrict fluid flow to the inner cavity 1224.

A cap 1230 adjacent to the upper cylindrical portion 1212 opposite the groove 1216 provides an outer surface of the valve 1200 after installation and seals the valve within the fluid circuit of the thermal control system by preventing fluid from escaping past the cap. A member 1232 extends from the cap opposite the upper cylindrical portion 1212 to provide a surface for more easily removing and/or installing the valve 1200 in the thermal member.

In operation, the valve 1200 is inserted into a thermal element of the cooler, such that the groove 1216 and at least one opening 1218 are positioned in fluid connection with the out-line of the thermal control system. The cooler thermal element is shaped similar to the thermal block 702 shown in FIG. 19, but made integral with the cooler instead of positioned in the cooler lines. Fluid traveling through the out-line from the transmission to the cooler either passes through valve 1200 via the at least one opening 1218 and inner cavity 1224 and/or around the valve along the groove 1216 to continue towards the cooler. This is a default, cooler flow position of the valve 1200, whereby fluid is allowed to flow from the transmission to the cooler and back again to supply cooled fluid to the transmission. The bearing ball 1204 blocks fluid access through the inner cavity 1224 and out the free end 1220 in the default position, as the spring 1206 holds the bearing ball in contact with an inner circumferential edge of the beveled edge 1222 shared by the inner cavity 1224 and free end 1220. The O-rings 1210 and 1208 positioned within grooves 1228 and 1226 provide sealing edges that keep fluid from escaping along an outer surface of the valve 1200 in either direction along a longitudinal length of the valve (i.e. toward the cap 1230 or free end 1220). When pressure builds up in the out-line, due for example to a blockage in the cooler preventing fluid flow from the cooler to the transmission via the in-line, forces act on the bearing ball 1204 within the inner cavity 1224 to compress spring 1206. This in turn opens a passage from the inner cavity 1224, around the bearing ball 1204, and through the free end 1220 allowing fluid to flow from the out-line directly into the in-line, bypassing the cooler. Fluid then flows from the out-line through the at least one opening 1218, into the inner cavity 1224, around the bearing ball 1204, past the spring 1206 through gaps in spring coils, and into the in-line. Once pressure eases in the out-line, the spring 1206 expands, forcing the bearing ball 1204 to once again seal the opening at the juncture of the inner cavity 1224 and beveled edge 1222. Unlike the valve 600, there is no piston element. The large diameter end 1242 of the spring 1206 rests around an opening of the in-line or similar structure. Even when compressed, fluid is allowed to laterally flow through the spring into the in-line. As thermal elements in the cooler lines and in the cooler are similar, depending on the make and model of a particular transmission, embodiments of valves 600 and 1200 may be interchangeable in structure and may be modified in particular dimensions to fit either thermal element.

As with valves shown in FIGS. 7 and 15, the valve 600 utilizes a spring wherein the spring is present in the fluid flow of the system and is therefore a differential pressure regulating device instead of a blow-off, or pressure-limit device as provided in FIG. 2.

The valve 600 is compatible with at least Ford® 6R80/90, 4R70/75, and 6F35 transmissions.

The described valves replace OEM valves to apply embodiments of a process of converting the OEM thermal bypass control system, with the three operating states and features previously described, i.e. fully ON, fully CLOSED, and partial ON, to a two-state system that by default has a state with cooler flow switched ON, and as a secondary state has a safety bypass directly to a cooler return or lube as an emergency state when the cooler and or lines are blocked, pinched, or damaged in such a way as to seriously compromise cooler flow and lube. In the OEM state, when this happens, serious damage results from a starvation of lubricant and adequate cooling. The consequences can range from overheated fluid temperature to severe planetary damage, and possibly vehicle fire if an operator ignores warning lamps and continues to operate the vehicle, especially under heavy load. With the instant embodiments of the process applied to a transmission, lubrication is delivered despite cooler blockage. When the over-temperature warning lamp turns on, the operator may continue to operate the vehicle to return it for repair while averting a complete planetary system crash.

Depending on a particular transmission build, one of two preferred embodiments are employed to improve the thermal control system of an automotive transmission. Both embodiments provide the similar major features, as well as the benefits, that precipitate from them, although the implementation may vary according to vehicle specifics, the location of the thermal control system, and/or type of housing that contains it. One primary feature is full time cooler flow. Cooler fluid fills the cooler and lines immediately on initial fill after transmission rebuild or replacement. Further, there is an accurate fluid level check without a warm-up cycle. Next, there is an emergency safety bypass directly to the lube system to prevent catastrophic planetary failure in the event the cooler is restricted or blocked, or lines are pinched or smashed. There are also lower average operating temperatures, typically between 62.778-73.889° C. (145-165° F.), which is about a 21.111° C. (70° F.) reduction from OEM thermal control temperatures.

The first embodiment of the method includes providing a flow-blocking device that functions as a blow-off or pressure limit valve. FIG. 24 illustrates a thermal control system in a transmission pump implementing a process with a pressure limit valve. The OEM valve is removed and replaced with a valve like the one shown in FIGS. 2-5 of the instant disclosure. The valve is installed into the pump replacing the OEM valve. In a default state, or position at vehicle start-up, the relief valve 1106 blocks a direct path 1134 between in-line 1120 and out-line 1118 through the thermal element. This forces cooler fluid to flow from other valves 1128 in the pump 1132, through out-lines 1134 and 1124, to the cooler 1122, through in-lines 1126, 1120, 1121, and 1130 and back through gears 1116, pump 1132 and other valves 1128, If PSI within the fluid circuit of in-lines and out-lines reaches the blow-off PSI, the relief valve 1106 is forced outward away from a center of the pump 1132 and the spring 1108 is compressed, thus allowing for cooler flow from the valves 1128, through out-line 1134, line 1118, line 1112, the direct path 134, line 1121, through the gears 1116, in-lines 1130, and back into the valves 1128 to include the thermal element in the circuit and bypass the cooler 1122. This scenario would occur if a blockage in the cooler 1122 prevents fluid flow through the cooler. When pressure decreases in the out-lines, forces on the relief valve 1134 decrease and the spring 1108 expands to push the relief valve back towards the blocker valve 1104. This re-establishes flow from the pump and transmission to the cooler. The spring 1108 is in a vented area between the relief valve 1134 and cap 1110, so there is no counterbalance oil pressure on the spring side of the relief valve. Therefore, the blow-off PSI is equal to the spring tension divided by the area of the end of the valve 1134. The area of the valve and spring tension can then be altered to achieve a preferred blow-off PSI at which point the valve will switch the system between the cooler bypass configuration or the configuration allowing flow to the cooler.

Figure 20A:
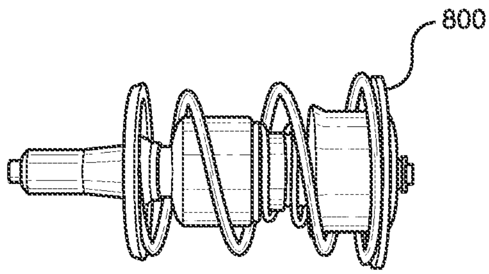
FIG. 20A shows a factory-original thermal control bypass valve in a default position to allow fluid bypass.
Figure 21A:
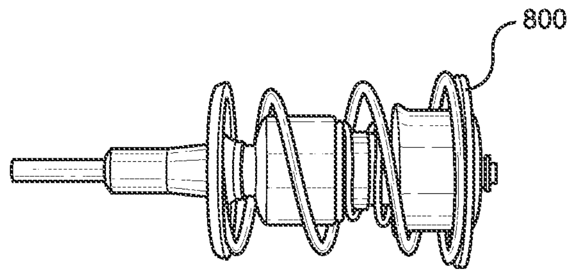
FIG. 21A shows a factory-original thermal control bypass valve in an altered, extended position to allow fluid flow to the cooler.
Figure 20B:
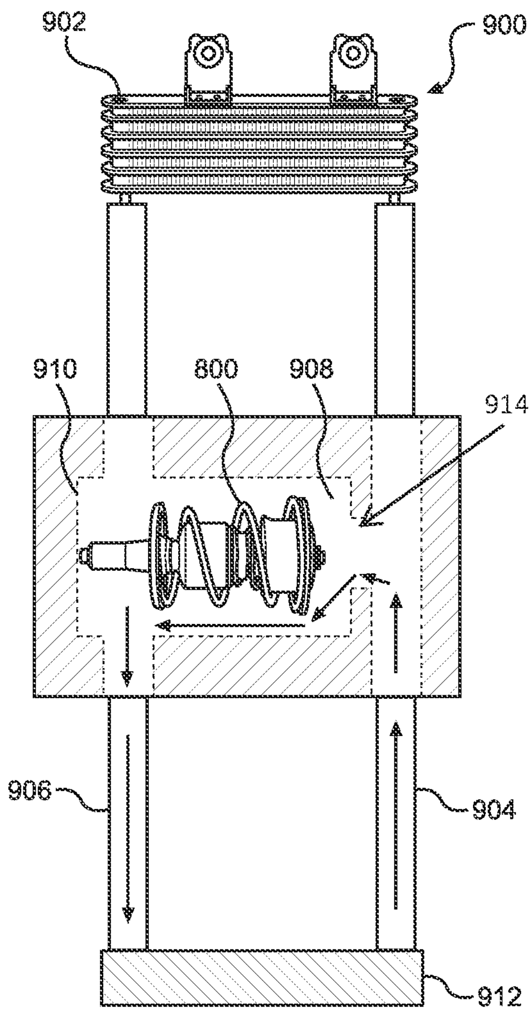
FIG. 20B shows an illustration of a fluid circuit through a thermostat block with the valve of FIG. 20A in a default, cooler bypass position according to prior art systems.
Figure 21B:
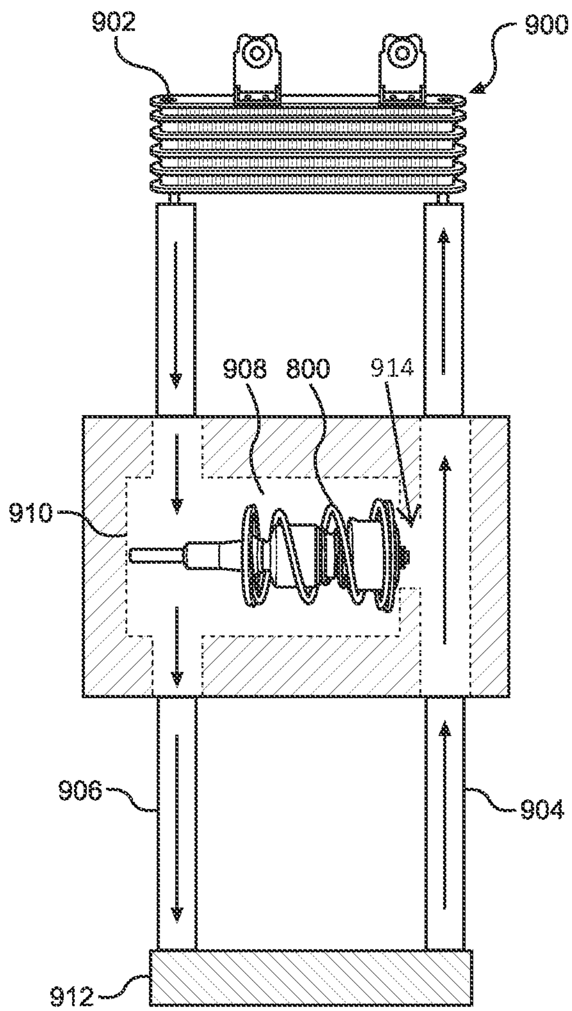
FIG. 21B shows an illustration of a fluid circuit through a thermostat block with the valve of FIG. 21A in an altered position to permit fluid flow through the cooler according to prior art systems.

A second embodiment of the method includes replacing an OEM valve in the thermal element with an intermediary or differential pressure regulating device. This pressure provides a counter-balance force on equal areas. FIGS. 20A and 21A show an OEM valve in a default and altered position, respectively. FIGS. 20B and 21B show the OEM valve installed in a thermal block in either the default or altered position, respectively, to illustrate a simplified thermal control fluid circuit. At start-up in an OEM system 900, the valve 800 is retracted per FIG. 20A, either fully or partially depending on fluid temperature as previously discussed, allowing cooler fluid flow from transmission 912 through the out-line 904. The fluid then flows through an opening 914 into an inner cavity 908 of the thermal element 910 and back to the transmission 912 via an in-line 906. This state of the OEM thermal control system 900 is shown in FIG. 20B and ensures that a majority of the fluid through the out-line 904 bypasses the cooler 902. The design of the OEM valve 800 and system 900 assumes that full flow through the cooler would only be necessary when fluid temperature becomes too high. In such a case, silicon in the valve 800 expands, causing the valve to lengthen and block the entrance to the inner cavity 908 of the thermal element 910. The lengthened OEM valve 800 is shown in FIG. 21A. As seen in FIG. 21B, the altered OEM valve 800 blocks liquid flow through the opening 914. Cooler fluid would then be forced from the transmission 912 through the out-line 904 to the cooler 902 and transported back to the transmission via the in-line 906.

The second embodiment of the method pertains to environments where there is fluid pressure, or cooler return, in the area that contains the spring, as opposed to the first embodiment where the spring is in vented area separate from the fluid circuit. In this case the formula now includes cooler return PSI, so is expressed as follows:

PRESSURE 1 (to cooler)×AREA=SPRING+PRESSURE 2 (cooler return).

This formula is used to determine corresponding dimensions and structures of the valves of this embodiment to set a preferred pressure differential within the system for the system to maintain via the valve.

Figure 22:
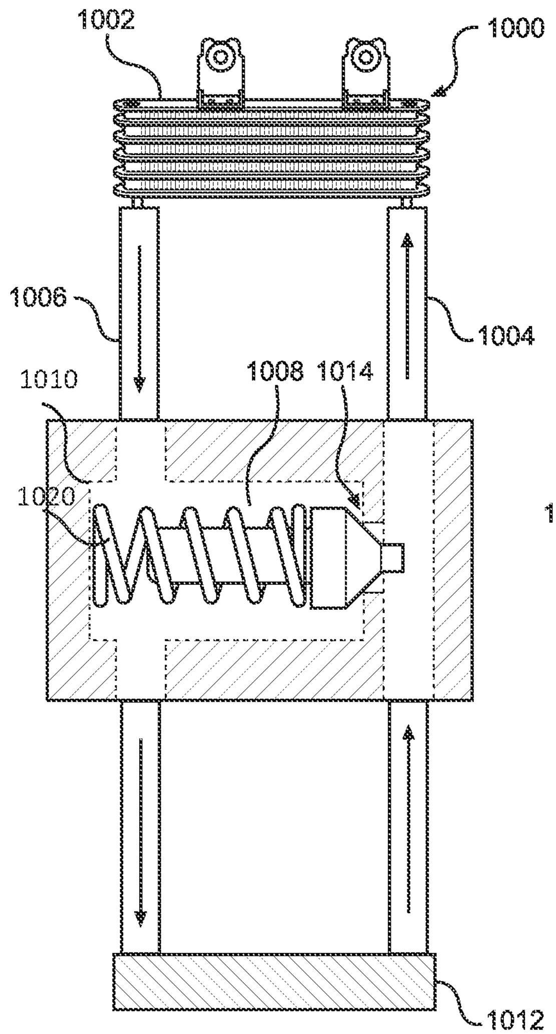
FIG. 22 shows an illustration of a fluid circuit through a thermal element with a valve in a default position allowing fluid flow through the cooler according to an embodiment of the present invention.
Figure 23:
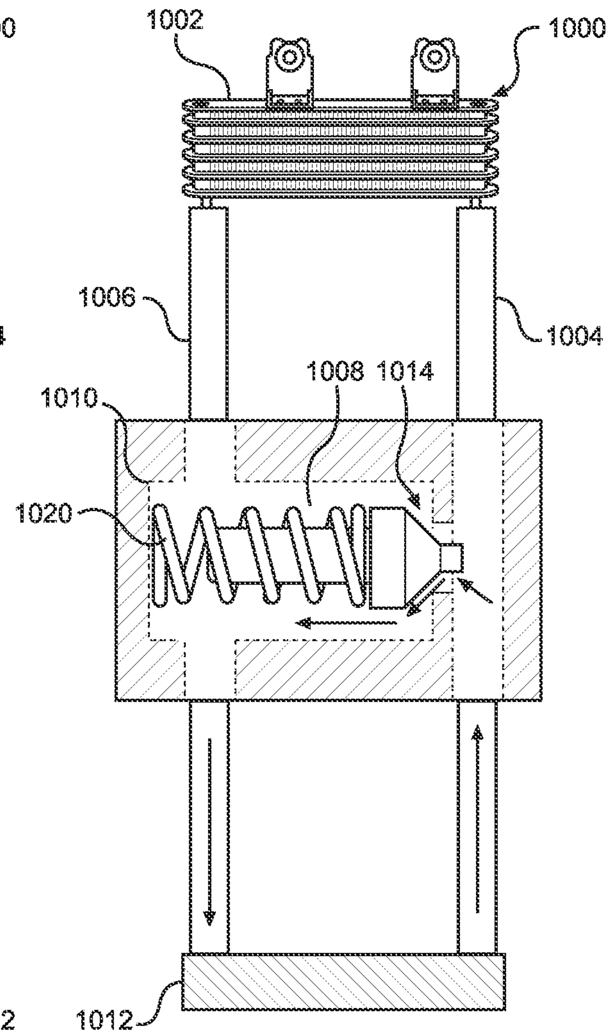
FIG. 23 shows an illustration of a fluid circuit through a thermal element with the valve in an altered position to allow cooler bypass according to an embodiment of the present invention.

FIGS. 22 and 23 illustrate the application of the second embodiment of an inventive system 1000 improving the OEM system 900 shown in FIGS. 20B and 21B. A transmission 1012, out-line 1004, in-line 1006, cooler 1002, and thermal element 1010, including a valve 1020, are shown. A default state, or cooler flow ON, of the instant method is shown in FIG. 22. An entrance 1014 to a bypass chamber 1008 of the thermal element 1010 from the out-line 1004 is closed by the valve 1020, forcing fluid flow from the transmission 1012 directly to the cooler 1002 and back to the transmission via the in-line 1006 at start-up of the vehicle. This ensures a proper supply of cooled liquid lubricant during start-up. When cooler flow through the cooler 1002 is blocked, a pressure differential is created such that pressure in the in-line 1006 approaches zero. In that instance, the system 1000 behaves as shown in FIG. 23 such that the valve 1020 is compressed by the fluid pressure in the out-line 1004. This allows fluid through opening 1014 and into the bypass chamber 1008, allowing fluid to flow from the out-line 1004, through the bypass chamber and back to the transmission 912 via the in-line, bypassing the cooler 1002.

For example, assuming a particular transmission with all OEM parts regulates a minimum main line pressure of 448.159 kPa (65 PSI), and characteristically delivers 2.0 GMP at 275.79 kPa (40 PSI) from the converter to the cooler lines (cooler out-line), the cooler in-line back to the transmission delivers the same 2.0 GPM at 137.895 kPa (20 PSI). If the cooler was to become blocked, then the cooler out-line would rise to nearly equal to main line PSI, so from 275.79 kPa (40 PSI) to 448.159 kPa (65 PSI), and the cooler in-line would drop toward zero.

Conversely, a valve of the instant invention installed with a spring calibrated for a preferred pressure differential of 275.79-310.264 kPa (40-45 PSI) would allow for a bypass supply of 1.0-2.0 GPM fluid at 103.421-172.369 kPa (15-25 PSI), at 413.685-448.159 kPa (60-65 PSI) in the cooler OUT line, through the bypass chamber and back to the transmission through the cooler IN line. This keeps a steady supply of fluid into the planetary system. Maintaining a pressure differential range of 241.317-379.212 kPa (35-55 PSI) is desired in this embodiment of the process, and a pressure differential of 310.264 kPa (45 PSI) is most desired. In this situation, the fluid through the bypass chamber will be hotter than in a default state, but crucially an adequate supply of lubrication will continue to be provided to prevent catastrophic planetary failure. Valves of FIGS. 7 and 15, and their corresponding embodiments may be employed in the instantly described method for improving fluid flow in the thermal control system. Such valves include fluid pressure, or cooler return, in the area that contains the spring.

Importantly, the embodiments of the present invention operate on fluid pressure in the cooler lines, either or both of the out-lines and in-lines. High pressure or pressure differentials can be obtained in either extreme heat or in extreme cold. Fluid in the lines of the system approaching either transitional state, between liquid-solid or liquid-gas states, can expand within the lines of the system and increase pressure necessary to instigate a bypass of the cooler. Most discussion so far has assumed high operating temperatures causing increased pressure, or non-temperature related pressurizing events, such as blockages in the cooler. However, extreme cold causes fluid in the lines to begin to gel into a viscous liquid and toward a solid. This slows or prevents cooler flow in the cooler and/or lines. Therefore, systems of the instant invention allow bypass of the cooler under extreme cold conditions and revert back to allowing flow through the cooler under normal operating temperatures, typically once the fluid melts from a gel form.

FIGS. 26A-26E provide views of a ZF 8 transmission 1320, a corresponding OEM thermal bypass device 1300, and corresponding engine coolant warmer 1340. The ZF 8 transmission 1320 and OEM thermal bypass device 1300 were originally designed to ideally maintain a partial mix, or between full cooler flow and full cooler bypass. At engine start, a silicon pack 1304 of the OEM thermal bypass device 1300 is in a contracted position and cooler bypass through the engine coolant warmer 1340 is fully open. Due to flow through the cooler lines acting as a resistor to cooler fluid flow, the transmission fluid travels through opening 1330, into the warmer via hole 1342 where hot engine coolant entering and leaving the warmer via lines 1348 and 1350 is used to heat the transmission fluid, which then passes through hole 1344 of the warmer and back into the transmission 1320 via hole 1332. As the transmission fluid is heated in this manner, the silicon in the silicon pack 1304 is likewise heated and begins to expand. The silicon expanding causes an extender pin 1302 to extend and push a seat 1306 to close against opening 1328 inside the transmission 1320, the opening 1328 leading to opening 1330. This seals off transmission fluid flow to the warmer 1340, thereby forcing fluid flow to the cooler via opening 1327 and cooler flow opening 1326 and cooler flow return opening 1324. As the silicon in the silicon pack 1304 cools, the seat 1306 unseals slightly to ideally allow some fluid flow to the warmer 1340 via opening 1328, 1330 and some fluid flow to the cooler via opening 1327 to maintain a constant preset temperature.

However, this configuration is only ideal if the corresponding vehicle is at a steady cruising speed in top gear with the converter clutch applied. Otherwise, transmission temperature constantly fluctuates as workload and driving conditions change. The silicon pack 1304 is constantly expanding and contracting which over time wears out the silicon. Time, contaminants in the fluid, and inherent fragility leads to pin 1302 sticking, the seal 1306 wearing out, and the silicon pack 1304 rupturing. This in turn causes transmission 1320 overheating, burnt fluid, and over-expansion of valves, solenoids, and other components, which all cause malfunction or engine failure.

Figure 27:
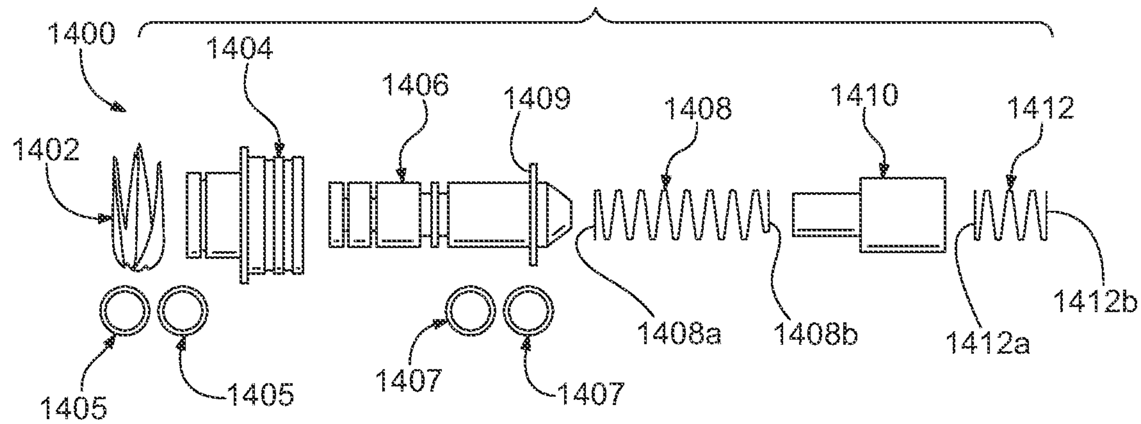
FIG. 27 is a side view of a thermal bypass device according to an embodiment of the present invention.

The thermal bypass valve 1400 of FIG. 27 has been designed to overcome the issues present in the design of the OEM thermal bypass device 1300. Unlike the other thermal bypass valve embodiments described in this disclosure, the thermal bypass valve 1400 corresponds to a transmission that regulates cooler fluid feed at a fixed value, preferably, but not limited to, approximately 172.37 kPa (25 PSI), which includes for example the ZF 8 transmission 1320. This means that the cooler regulator valve in the main control valve body of the transmission regulates and delivers cooler flow at 172.37 kPa regardless of the flow rate of transmission fluid. Consequently, the design of the thermal bypass valve 1400 cannot rely on changes in internal pressure, i.e. changes in transmission fluid pressure, to operate bypass functions of the thermal bypass valve unlike other thermal bypass valves discussed herein. The thermal bypass valve 1400 therefore includes at least three manual, user-selectable positions of the thermal bypass valve to correspondingly select desired bypass states. Such a configuration of the thermal bypass valve 1400 is applicable to other transmissions designed to provide a fixed transmission fluid pressure regardless of fluid flow rates.

Figure 28:
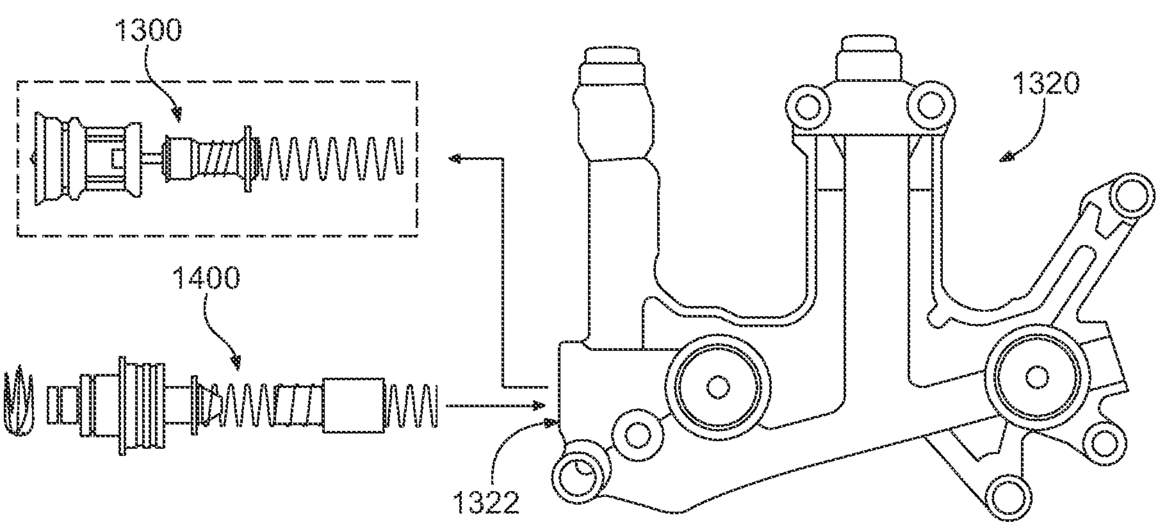
FIG. 28 is a side view of the transmission of FIG. 26A, where the OEM thermal bypass device of FIG. 26D is replaced with the thermal bypass device of FIG. 27.

The thermal bypass valve 1400 includes a retainer clip 1402, a plug 1404, one or more plug O-rings 1405, a plunger 1406, one or more plunger O-rings 1407, a flange 1409, a first spring 1408, a blocker valve 1410, and a second spring 1412. The thermal bypass valve 1400 is generally cylindrical, with each separate component having same or different diameters relative to each other. Further, components 1402, 1404, 1406, 1410, and 1412 may have their own sub-elements with different diameters. The exact shape and diameter of the thermal bypass valve 1400 may vary to conform to the shape and size of a corresponding bore of the transmission to direct and control fluid flow as described herein. In operation, the thermal bypass valve 1400 is oriented as shown in FIG. 28, with the plunger inserted through and held within an opening 1419 of a cylindrical upper member 1414 of the plug 1404 along end 1424*a*, except that the clip 1402 may by further attached to the plug 1404 and the plunger 1406, The opening 1419, together with an opening 1415 along opposite end 1424*b*, forms an inner cavity 1417 of the plug 1404. The plunger 1406 extends through the inner cavity 1417 of the plug 1404 such that opposite ends 1436*a*, 1436*b* of the plunger extend beyond either end 1424*a*, 1424*b* of the plug. The one or more plug O-rings 1405 are each secured in a corresponding groove 1422 located along an outer circumference of a lower member 1418 of the plug 1404. The one or more plunger O-rings 1407 are each secured in a corresponding groove 1430 located along an outer circumference of the plunger 1406. The flange 1409 is secured within a flange groove 1432 located along the outer circumference of the plunger 1406, the flange groove 1432 positioned between the one or more grooves 1430 and the end 1436*b*.

The first spring 1408 is positioned between and against the plunger 1406 and the blocker valve 1410. In the preferred embodiment of the thermal bypass valve 1400, the first spring 1408 is positioned against the flange 1409 secured to the plunger 1406 and a lip 1443 along an outer surface of the blocker valve 1410. The second spring 1412 is positioned against and between the blocker valve 1410 and an inner surface 1329 of the transmission bypass valve bore beyond opening 1328. The retainer clip 1402 is optionally secured within a retainer clip groove 1420 on an outer circumference of the upper member 1414 of the plug 1404 and within one of several retainer clip grooves 1428 along the outer circumference of the plunger 1406. The retainer clip 1402 may optionally not be attached to the plug 1404 and plunger 1406 in operation, namely when the thermal bypass valve 1400 is in a full bypass configuration. The retainer clip 1402 therefore preferably has at least two areas of attachment which are secured together to prevent movement of the two areas of attachment relative to each other when secured to plug 1404 and plunger 1406.

When installing the thermal bypass valve 1400, the OEM thermal bypass device 1300 is first removed from the bypass valve opening 1322 located on the transmission 1320, as shown in FIG. 28. The second spring 1412 is then inserted through the opening 1322 and through opening 1328, which leads to the opening 1330, and against inner surface 1329, Next, the blocker valve 1410 is inserted along end 1446*a*, with end 1446*b* directed towards the opening 1322. A blocker portion 1440 of the blocker valve 1410 is inserted coaxially through and flush with the opening 1328, causing the second spring 1412 to contract. The first spring 1408 is then inserted such that one end 1408*b* of the first spring is slid over a receiving portion 1442 of the blocker valve 1410 and against the lip 1443, such that the first spring is preferably coaxial with the blocker valve and second spring 1412.

Alternatively, the first spring 1408 may be inserted such that one end 1408*b* of the first spring is slid over a receiving portion 1442 of the blocker valve 1410 before either the first spring or blocker valve are inserted into the transmission 1320, with both then being inserted together at the same time.

The plunger 1406, with the plunger O-rings 1407 and the flange 1409 secured within the grooves 1430 and 1432, respectively, is then inserted through the opening 1322. The end 1436*b* of the plunger 1406 is inserted first with a partial length of the plunger equal to the length between the flange 1409 and the end 1436*b* inserted within an opposite end 1408*a* of the first spring 1408, such that the first spring 1408 and plunger are preferably coaxial. The plug 1404, with the plug O-rings inserted within grooves 1422 is then inserted into the transmission 1320 along the end 1424*b* such that the lower member 1418 is inserted within the opening 1322. Simultaneously, the plug 1404 is secured around the plunger 1406 by inserting the end 1436*a* of the plunger through the opening 1415, into the inner cavity 1417, and through the opening 1419 such that the end 1436*a* of the plunger extends beyond the end 1424*a* of the plug. If applicable, the retainer clip 1402 is then secured to the plug 1404 and plunger 1406 at the desired location depending upon the user-selected bypass configuration.

Alternatively, the plug 1404 and plunger 1406, and retainer clip if applicable, may be secured together in the same fashion before either of the plug or plunger are inserted through the opening 1322, In this manner, the plug 1404 and plunger 1406 can be inserted together as one unit.

An OEM retainer clip or similar known mechanism for securing the thermal bypass valve within the valve bore, not shown, may be used to secure the thermal bypass valve 1400 within the valve bore and transmission 1320, by securing within the opening 1322 and against a cap 1416 of the plug 1404.

Figure 29:
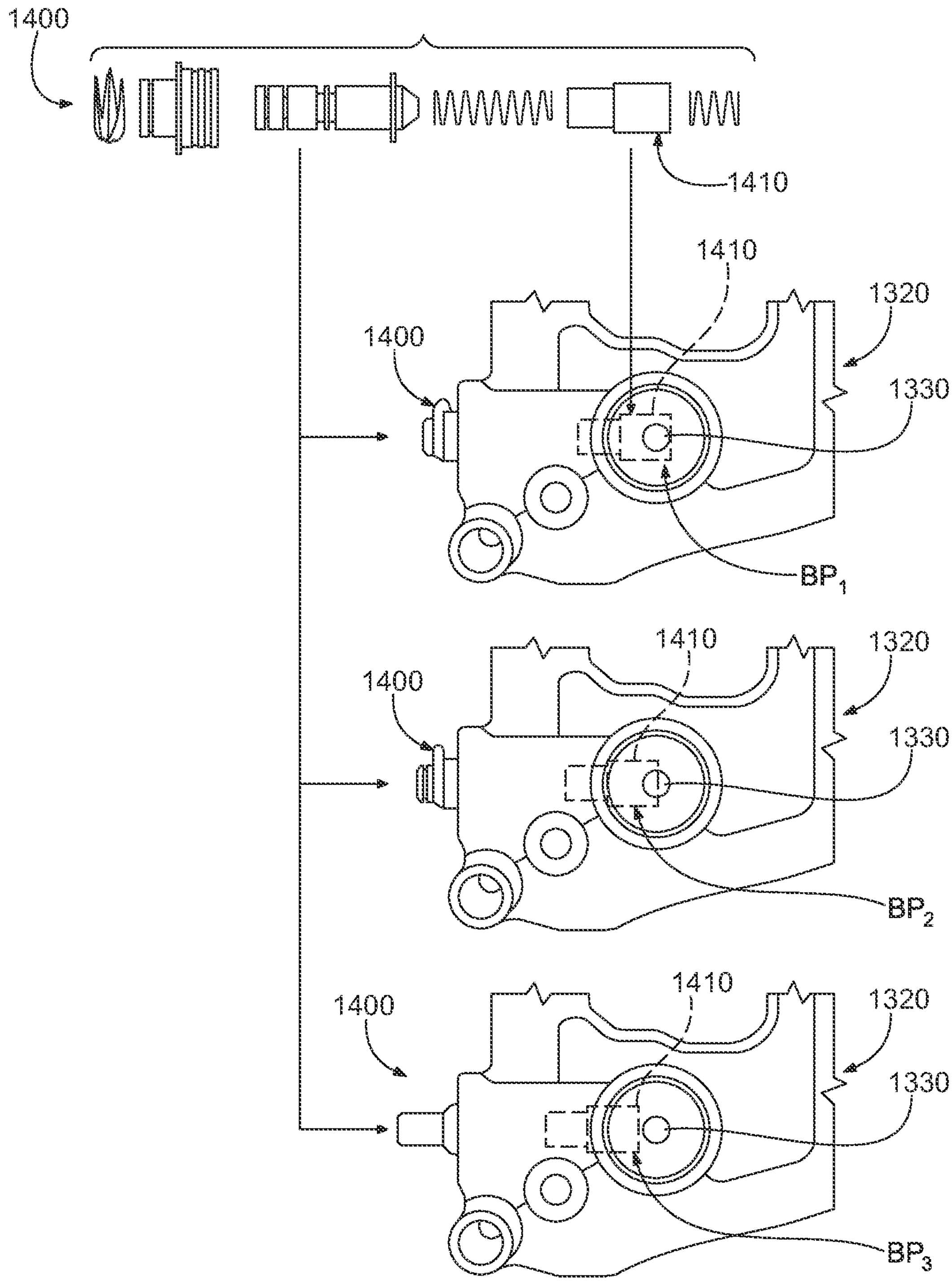
FIG. 29 is a diagram along the side view of the transmission of FIG. 26A and the thermal bypass device of FIG. 27 showing the thermal bypass device installed within the transmission in three different configurations and a corresponding position of a cylindrical blocker valve of the thermal bypass device in each different configuration.

FIG. 29 provides a diagram of three different bypass configurations $BP_1$, $BP_2$, and $BP_3$. However, the structure of the thermal bypass valve 1400 may allow for any number of different bypass configurations between full cooler flow and full bypass. For each of the three bypass configurations $BP_1$, $BP_2$, and $BP_3$ shown by way of example in FIG. 29, the position of the plunger 1406 relative to the plug 1404 affects the relative position of the blocker valve 1410 relative to the opening 1330 into the engine coolant warmer 1340. In the bypass configuration $BP_1$, the thermal bypass valve 1400 is configured to block all transmission fluid flow to the engine coolant warmer 1340 and force all transmission fluid flow to the cooler. In this configuration, the plunger 1406 is fixed deeper in the transmission thermal bypass valve bore by positioning the retainer clip 1402 in groove 1428*a* and groove 1420. The flange 1409 is therefore fixed closer to the lip 1443 which forces the first spring 1408 to contract. However, as the plunger 1406 is fixed in position, but the blocker valve 1410 is not fixed relative to the plunger or plug 1404, the first spring 1408 acts on and moves the blocker valve 1410 to completely cover the opening 1330 with the blocker portion 1440 to prevent fluid flow through the engine coolant warmer 1340. The counteracting forces of the springs 1408 and 1412 hold the blocker valve 1410 in place between them over the opening 1330. In other words, the thermal bypass valve is configured for full cooler flow, which provides maximum transmission fluid flow and cooling.

In bypass configuration $BP_2$, the thermal bypass valve 1400 is configured to allow partial transmission fluid flow to the engine coolant warmer 1340 and partial fluid flow to the cooler. This is also referred to as mixed flow or partial mix fluid flow. The retainer clip 1402 is secured within groove 1428*b* and groove 1420, which secures the plunger 1406 and the flange 1409 farther away from the blocker valve 1410 and lip 1443 relative to the positioning of the same elements in bypass configuration $BP_1$. As there is less force acting on the first spring 1408, the blocker valve 1410 is moved such that the blocker portion 1440 only partially covers the opening 1330. The counteracting forces of the springs 1408 and 1412 hold the blocker valve 1410 in place between them to partially cover the opening 1330. This configuration allows limited fluid flow through the engine coolant warmer 1340 while also allowing fluid flow through the cooler. This will result in elevated operating temperatures relative to the bypass configuration $BP_1$.

In bypass configurations $BP_3$, thermal bypass valve 1400 is configured to allow full fluid flow to the engine coolant warmer 1340, or full cooler bypass. The retainer clip 1402 is not attached to the plug 1404 and plunger 1406, which allows the second spring 1412 to push the blocker valve 1410 away from blocking the opening 1330. The first spring 1408 then pushes the plunger 1406 back toward the opening 1322. The plunger O-rings 1405 seal off fluid from escaping between the plug 1404 and plunger 1406, and the flange 1409 prevents the plunger 1406 from being expelled from the bore and plug once it contacts a back surface of the inner cavity 1417. The thermal bypass valve 1400 is in full bypass in this configuration. The opening 1327 to the cooler is not blocked, but as the cooler line acts as a fluid circuit resistor, the transmission fluid will take the path of least resistance through the engine coolant warmer 1340. This configuration is useful to preheat the transmission 1320 to above 73.888° C. (165° F.) to meet a vehicle control module's temperature requirement to initialize a computer RE-LEARN state after a transmission repair or rebuild.

Figure 30A:
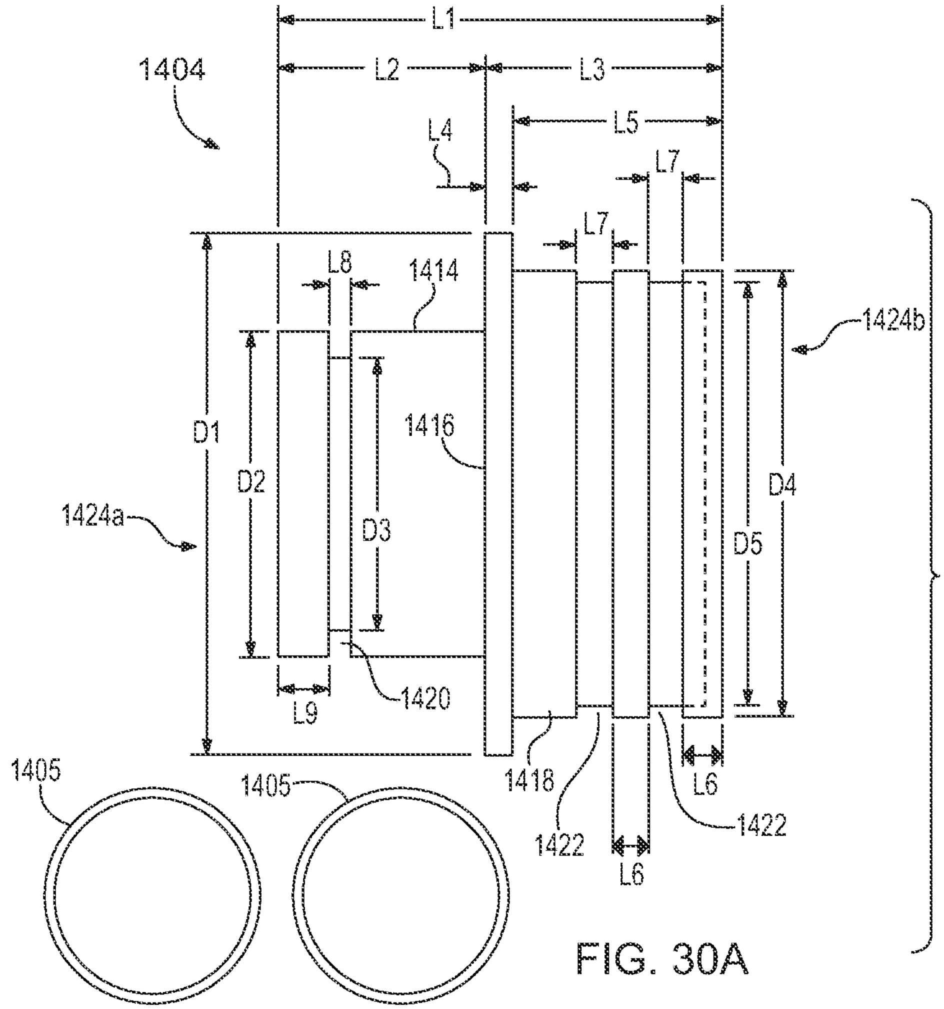
FIG. 30A is a side view of a cap portion of the thermal bypass device of FIG. 27.
Figure 30B:
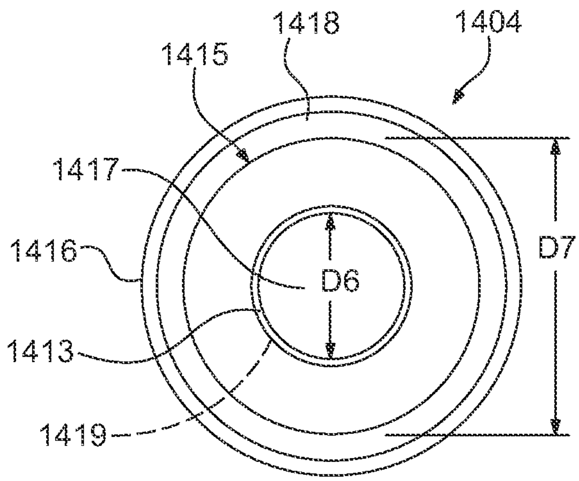
FIG. 30B is a bottom view of the cap portion shown in FIG. 30A.

FIGS. 30A and 30B show a preferred embodiment of the plug 1404 in more detail. The plug 1404 extends longitudinally along axis C-C. The plug 1404 includes the upper member 1414 and lower member 1418 on either side of a cap 1416, the upper member and lower member extending in opposite directions away from the cap, which is wider in diameter than both the upper member and lower member. The cap 1416, upper member 1414, and lower member 1418 are cylindrical, with the lower member 1418 shaped to fit the bore of the transmission thermal valve and the cap shaped to conform to opening 1322. However, the upper member 1414 can vary in shape and design. The upper portion 1418 has the groove 1420 extending continuously along its outer circumference. The groove 1420 is configured to hold and secure the retainer clip 1402 to the upper portion 1414 when needed. The lower member 1418 preferably has two grooves 1422, each configured to hold a corresponding plug O-ring 1405, The plug O-rings 1405, once properly installed in a corresponding groove 1422, provide a co-efficient of friction against the bore surface to help secure the plug 1404 in the transmission bore. The plug O-rings 1405 also help prevent fluid leakage between the plug 1404 and bore. The plug O-rings 1405 are preferably elastic and slightly smaller in diameter than the corresponding grooves 1422 to ensure a tight fit and are made from rubber or rubber-like materials or any material with similar and qualifying characteristics, such as exhibiting both a viscous and elastic nature under deformation. The opening 1419 includes a cylindrical channel extending through the upper member 1414 and adjacent to opening 1415, which includes another channel extending through the lower member 1418. Together, the openings 1415 and 1419 form the inner cavity 1417 extending along the length of the plug 1404, A bevel 1413 is preferably placed along the opening 1419 where that opening meets and is contiguous with opening 1415 in the inner cavity 1417. This bevel 1413 is configured to allow a plunger O-ring 1407 to elastically deform against the bevel such that the O-ring is not sheared, damaged, improperly moved or otherwise rendered inoperable in preventing fluid flow between the plug 1404 and plunger 1406.

The plug 1404 has preferred dimensions. The overall length $L_1$ of the plug 1404 is 21.717 mm (0.855"). The upper member 1414 has a diameter $D_2$ of 15.875 mm (0.625") and a length $L_2$ of 10.160 mm (0.400"). The groove 1420 has a diameter $D_3$ of 13.081 mm+/−0.0254 mm (0.515"+/−0.001") and a length of $L_8$ of 1.016 mm (0.040"). A length $L_9$ of the upper member 1414 above the groove 1420 is 2.540 mm (0.100"). The cap 1416 has a diameter $D_1$ of 25.146 mm (0.990") and a length $L_4$ of 1.4732 mm (0.058"). The lower member 1418 has a diameter $D_4$ of 21.844 mm (0.860") and an overall length $L_5$ of 10.1092 mm (0.398"). The grooves 1422 each have a diameter $D_5$ of 19.3802 mm+/−0.0254 mm (0.763"+/−0.001") and a length $L_7$ of 1.9558 mm (0.077"). The portion of the lower member 1418 between grooves 1422 and along the end 1424*b* each have a length $L_6$ of 1.524 mm (0.060"). The opening 1419 has a diameter $D_6$ of 11.1252 mm (0.438"). The opening 1415 has a diameter $D_7$ that may vary but is otherwise at least as large as diameter $D_6$ and at least smaller than diameter $D_4$. The bevel 1413 extends from a diameter of 11.0998 mm (0.437") to 11.684 mm (0.460").

Figure 30C:
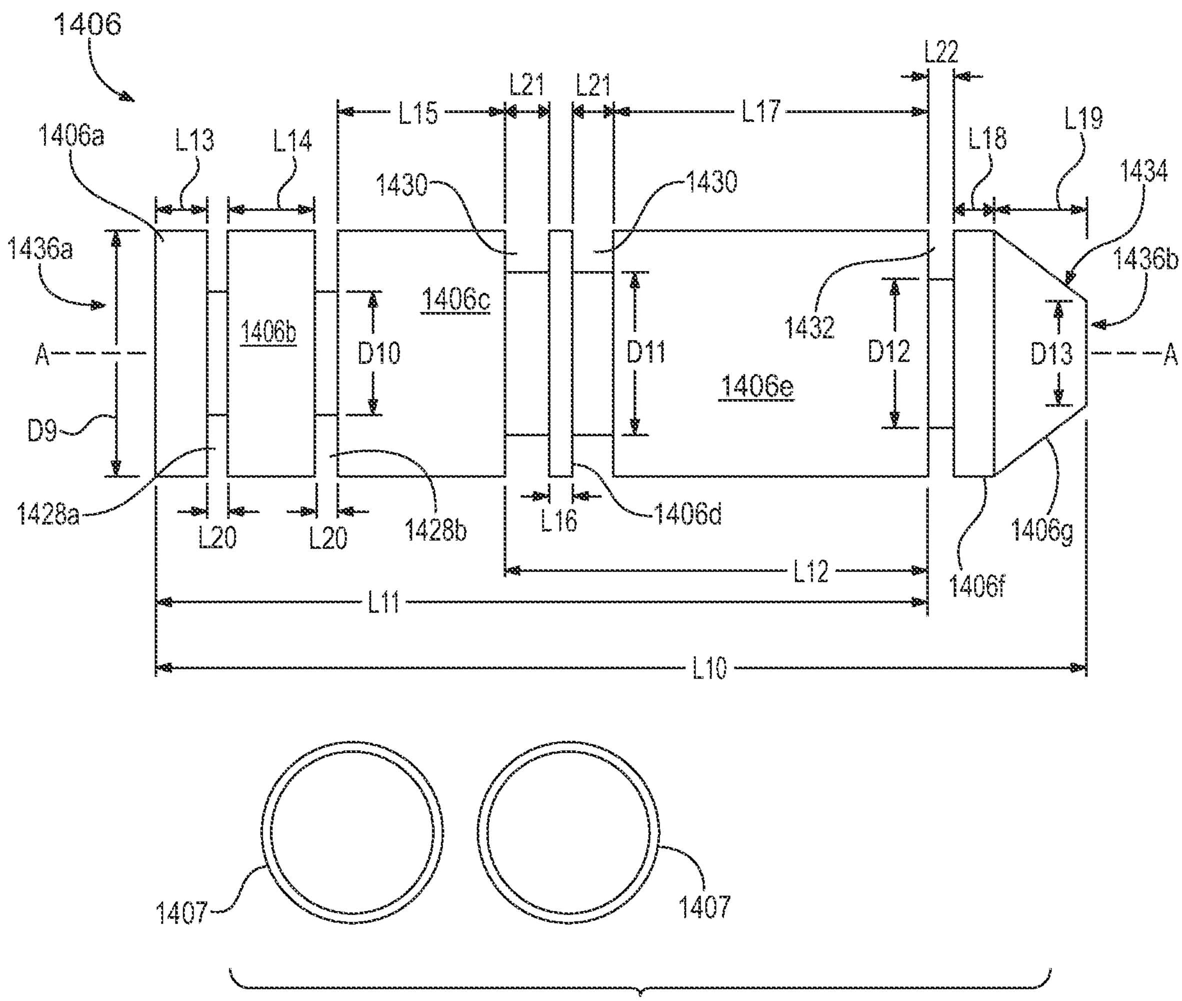
FIG. 30C is a side view of a plunger of the thermal bypass device of FIG. 27.

FIG. 30C shows the plunger 1406 from the side extending along a longitudinal axis A-A. The plunger 1406 is cylindrically shaped and longitudinally extending along axis A-A to slidably engage the plug 1404 through the opening 1419. In the preferred embodiment, the plunger 1406 has retaining clip grooves 1428 near end 1436*a*, including groove 1428*a* corresponding to full cooler flow and groove 1428*b* corresponding to mixed flow. Additionally grooves 1428 may be present if more than three bypass configurations are desired. The groove 1432 is located along the plunger 1406 near end 1436*b* and is configured to removably secure the flange 1409. Alternatively, the flange 1409 may be permanently attached about the plunger or be an extension thereof. Between grooves 1428 and groove 1432 are one or more grooves 1430 configured to secure a corresponding plunger O-ring 1407 about the plunger 1406 to prevent the plunger from moving longitudinally through the plug 1404 along an entire length of the plunger once secured within the opening 1419. Along end 1436*b*, the plunger 1406 has a tapered surface 1434 for interacting with the first spring 1408. The plunger 1406 may alternatively not include the tapered surface 1434.

The plunger 1406 has an overall length $L_{10}$ of 48.387 mm (1.905"), with section 1406*a* having a length $L_{13}$ of 2.540 mm (0.100"), section 1406*b* having a length $L_{14}$ of 4.2164 mm (0.166"), section 1406*c* having a length $L_{15}$ of 8.6106 mm (0.339"), section 1406*d* having a length $L_{16}$ of 1.27 mm (0.050"), section 1406*e* having a length $L_{17}$ of 15.24 mm (0.600"), section 1406*f* having a length $L_{18}$ of 2.032 mm (0.080"), and section 1406*g* having a length $L_{19}$ of 7.620 mm (0.300"). The plunger 1406, including sections 1406*a*, 1406*b*, 1406*c*, 1406*d*, 1406*e*, and 1406*f*, has a diameter $D_9$ of 11.0744 mm (0.436"). The retainer clip grooves 1428 have a diameter $D_{10}$ of 5.9944 mm (0.236"). The plunger O-ring grooves 1430 each have a diameter $D_{11}$ of 7.9248 mm+/−0.0254 mm (0.312"+/−0.001"). The flange groove has a diameter $D_{12}$ of 7.366 mm (0.290"). The end 1436B of the plunger 1406 has a diameter $D_{13}$ of 5.080 mm (0.200"). A length $L_{12}$ of the plunger 1406 between, and including, the grooves 1430 and the groove 1432 is 20.320 mm (0.800"). A length $L_{11}$ of the plunger 1406 between the end 1436A and groove 1432 is 37.719 mm (1.485").

Figure 30D:
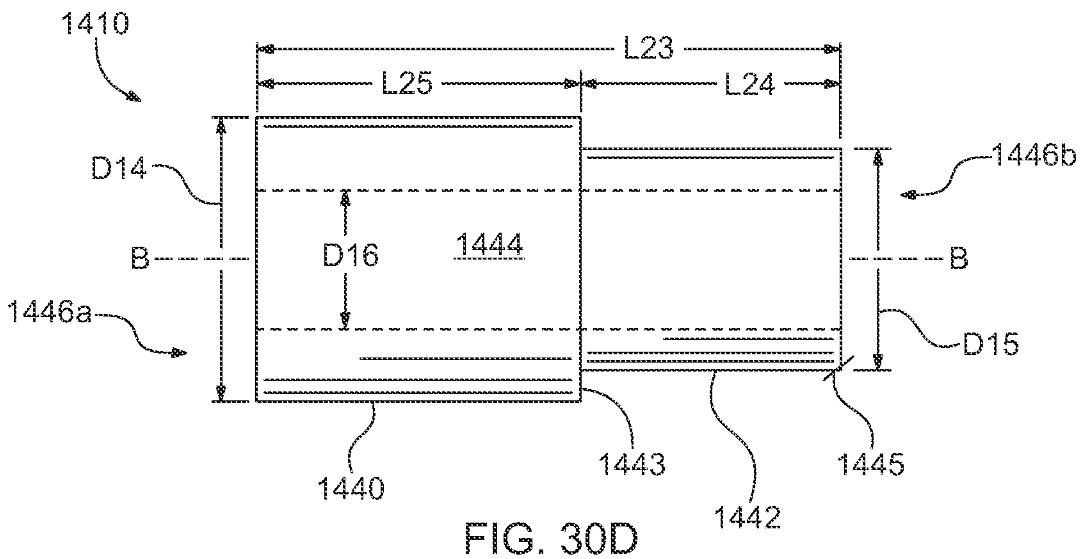
FIG. 30D is a cross-sectional view of the blocker valve of the thermal bypass device shown in FIG. 27.

FIG. 30D shows the blocker valve 1410 of the preferred embodiment of the thermal bypass valve 1400 extending longitudinally along axis B-B. The blocker valve includes the cylindrical blocker portion 1440 and the cylindrical receiving portion 1442 secured together about respective ends such that the two portions are preferably coaxial. A lip 1443 is formed where the two portions 1440 and 1442 meet, which provides a surface for the first spring 1408 to act against, with the other surface being the flange 1409. The lip is preferably a perpendicular surface relative to the longitudinal length of the block valve 1410 along axis B-B. An inner channel 1444 extends longitudinally through the blocker valve 1410 with an opening at either end 1446*a* and 1446*b*. The inner channel 1444 allows fluid flow past the blocker valve 1410 and to the engine coolant warmer 1340 when in a full bypass or mixed flow configuration. The blocker valve has an overall length $L_{23}$ of 28.448 mm (1.120"). The receiving portion 1442 has a length $L_{24}$ of 12.700 mm (0.500") and a diameter $D_{15}$ of 10.8458 mm (0.427"). The blocker portion has a length $L_{25}$ of 15.748 mm (0.620") and a diameter $D_{14}$ of 13.8684 mm (0.546"). The inner cavity 1444 has a diameter $D_{16}$ of 6.9088 mm (0.272").

Figure 31:
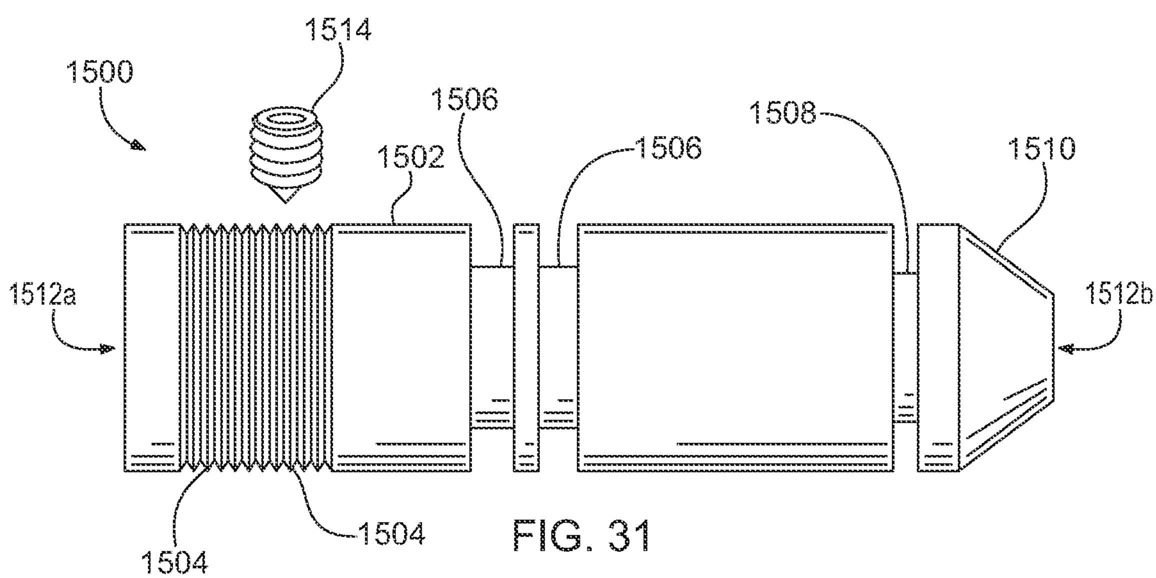
FIG. 31 is an alternate embodiment of the plunger with a threaded diameter corresponding to a screw for adjustment of the plunger relative to the cap portion.

FIG. 31 shows an alternate embodiment of the thermal bypass valve 1400, which includes the depicted plunger 1500. In this embodiment a retaining clip 1402 is not used. As such, retaining clip grooves 1428 are not needed or present on the plunger 1500. Instead, a screw 1514, or similar threaded member, is present in the plug 1404 and threadingly engages a threaded surface 1504 of the plunger, which replaces the grooves 1428. Rotating the screw 1514 in turn causes the plunger 1500 to extend or retract relative to the plug 1404. The screw 1514 can be adapted to receive known tools, such as Allen wrenches and screwdrivers, including Phillips, slotted, Robertson, and torix screwdrivers. The plunger 1500 otherwise retains the same structure as plunger 1400, including O-ring grooves 1506, a flange groove 1508, a tapered surface 1510, and ends 1512*a* and 1512*b*. All other components of the thermal bypass valve 1400 remain the same as previously discussed.

Figure 32A:
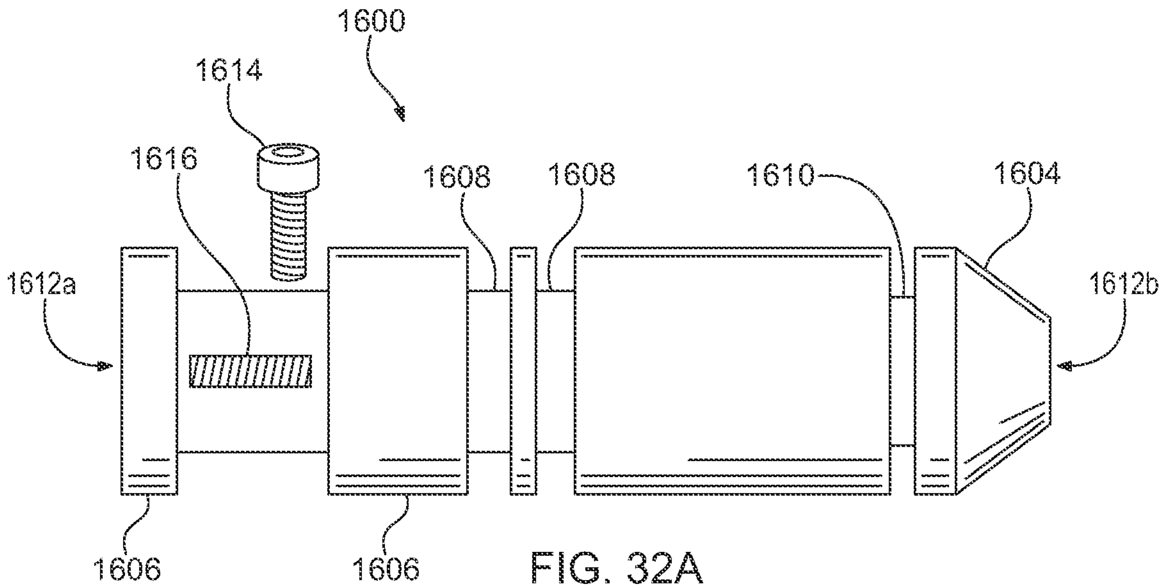
FIG. 32A is an alternate embodiment of the plunger with a threaded groove corresponding to a screw for adjustment of the plunger relative to the cap portion.
Figure 32B:
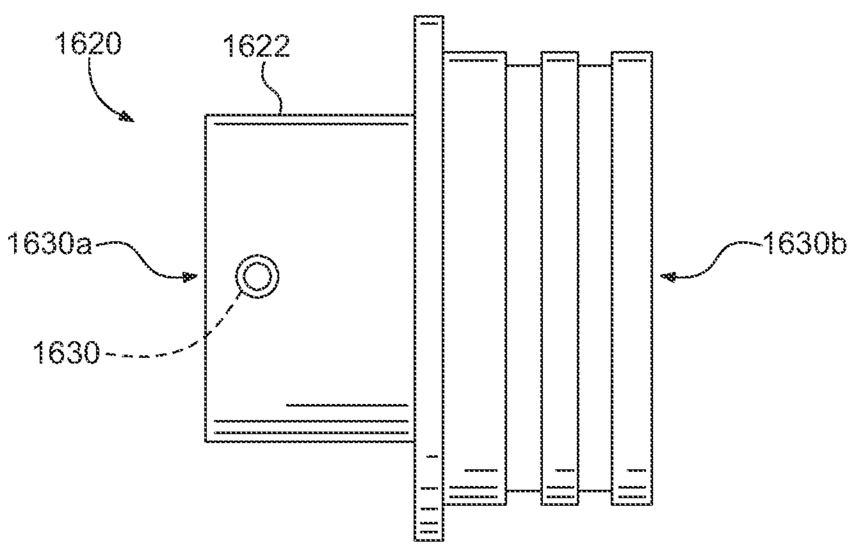
FIG. 32B is an alternative embodiment of the cap portion with a hole corresponding to the screw of FIG. 32A.
Figure 33:
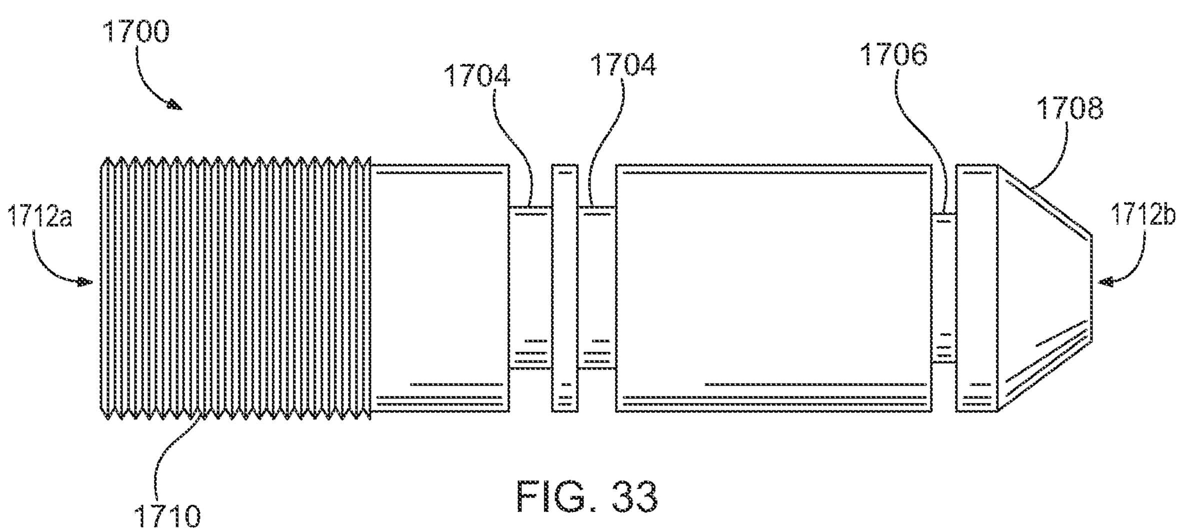
FIG. 33 is an alternate embodiment of the plunger with a threaded end corresponding to a nut for adjustment of the plunger relative to the cap portion.

Another embodiment of the thermal bypass valve 1400 is shown in FIGS. 32A-32B. In this embodiment, the plunger 1600 does not have the retaining clip grooves 1428 as the retaining clip 1402 is not used. Instead, the plunger 1600 is moved relative to the plug 1620 via a screw 1614 or other fastener inserted through a hole 1630 in the upper member 1622 of the plug 1620. The screw 1614 inserts through the hole 1630 and into a longitudinal groove 1616 in a circumferentially grooved section 1606, which contains threading or other textured surface configured to interact with the screw. Rotation of the screw 1614 while in the groove 1616 cause forward or backward longitudinal movement of the plunger 1600 relative to the plug 1620. The plunger 1600 otherwise retains the same structure as plunger 1406, including O-ring grooves 1608, a flange groove 1610, a tapered surface 1604, and ends 1612*a* and 1612*b*. The plug 1620 otherwise retains the same structure as plug 1404. All other components of the thermal bypass valve 1400 remain the same as previously discussed.

Yet another embodiment of the thermal bypass valve 1400 includes plunger 1700, with a threaded portion 1710 beginning along end 1712*a*. A nut, not shown, is secured along the threaded section 1710 and against the plug 1404 to secure the plunger at the desired position, instead of using the retaining clip 1402 and grooves 1428 or a fastener, as in FIGS. 31, 32A, and 32B. The plunger 1600 otherwise retains the same structure as plunger 1406, including O-ring grooves 1704, a flange groove 1706, a tapered surface 1708, and ends 1712*a* and 1712*b*. All other components of the thermal bypass valve 1400 remain the same as previously discussed.

In other embodiments of the thermal bypass valve, the flange 1409 may be integrally secured about and extending from the plunger 1406, instead of fitting into the flange groove 1432. In such an embodiment, the flange groove 1432 would be unnecessary.

Further, springs 1408 and 1412 may be of different lengths and have different spring forces to achieve the desired configurations of full cooler flow, full bypass, and different stages of mixed cooling and bypass. Likewise, the exact position of the plunger 1406 in the thermal valve bore can vary when configured to achieve full cooler flow, full bypass, or mixed flow depending on spring lengths and spring forces. All these factors may vary to achieve the proper positioning of the blocker valve 1410. It is the positioning of the blocker valve 1410 which ultimately determines full cooler flow, full bypass, or mixed flow in the transmission 1320 by fully blocking opening 1330, not blocking opening 1330 at all, or partially blocking opening 1330, respectively.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Features of embodiments and discussed herein may be combine with features of other embodiments discussed herein in some examples of implementation. Although various embodiments and examples have been presented, this disclosure describes, but does not limit, the invention. Various modifications and enhancements will become apparent to those of ordinary skill in the art and are within the scope of the invention.

We claim:

1. A thermal bypass valve, comprising:
- a plug having an inner cavity longitudinally extending between two oppositely oriented openings and a cap configured to prevent fluid flow between the thermal bypass valve and a valve bore in a transmission, the plug configured to insert into an opening of the valve bore;
- a longitudinally extending plunger configured to be secured coaxially through the inner cavity of the plug and extending beyond the two oppositely oriented openings of the plug;
- a blocker valve having and a fluid channel longitudinally extending between two oppositely oriented blocker valve openings;
- a first spring configured to be secured between the plunger and the blocker valve; and
- a second spring configured to be secured between the blocker valve and a surface of the valve bore,
- wherein, when the thermal bypass valve is installed in a transmission, a position of the plunger relative to the plug is manually changeable to enable full transmission fluid flow to a fluid cooler, full transmission fluid bypass of the fluid cooler, and mixed transmission fluid flow to the fluid cooler and to a fluid warmer.

2. The thermal bypass valve of claim 1, further comprising a flange secured to the plunger adjacent to a first end of the plunger, the flange configured to engage the first spring and extending perpendicularly from the plunger relative to a longitudinal axis of the plunger.

3. The thermal bypass valve of claim 2, wherein the blocker valve has a lip for engaging the first spring.

4. The thermal bypass valve of claim 1, wherein the plug further comprises an upper member and a lower member, the upper member and lower member longitudinally extending on either side of the cap.

5. The thermal bypass valve of claim 4, wherein the lower member has one or more grooves extending circumferentially along an outer surface of the lower member.

6. The thermal bypass valve of claim 5, further comprising one or more plug O-rings, each plug O-ring of the one or more plug O-rings corresponding to a groove of the one or more grooves extending along the outer surface of the lower member.

7. The thermal bypass valve of claim 1, wherein the plunger has one or more grooves extending circumferentially along an outer surface of the plunger.

8. The thermal bypass valve of claim 7, further comprising one or more plunger O-rings, one plunger O-ring of the one or more plunger O-rings corresponding to a single groove of the one or more grooves extending circumferentially along the outer surface of the plunger.

9. The thermal bypass valve of claim 1, wherein the plunger has a tapered surface along the first end.

10. The thermal bypass valve of claim 1, further comprising a retaining clip,
- wherein the plug has a retaining clip groove extending circumferentially along an outer surface of an upper member,
- wherein the plunger has a plurality of flow grooves extending circumferentially along an outer surface of the plunger, and
- wherein the retaining clip is configured to simultaneously secure in the retaining groove and one flow groove of the plurality of flow grooves.

11. The thermal bypass valve of claim 1, further comprising a means to manually change a position of the plunger relative to the plug when the plunger is secured coaxially through the inner cavity of the plug and extending beyond the two oppositely oriented openings of the plug.

12. A method of manually regulating transmission cooler flow, comprising:
- installing the thermal bypass valve of claim 1 in the transmission; and
- manually moving the plunger relative to the plug to set various bypass configurations, which changes a position of the blocker valve between the first spring and second spring relative to an opening to a fluid warmer,
- wherein changing the position of the blocker valve the opening to the coolant warmer allows for the full transmission fluid flow to the fluid cooler, full transmission fluid bypass of the fluid cooler, and mixed transmission fluid flow to the fluid cooler and to a fluid warmer.

13. The method of claim 12, further comprising removing the original equipment manufacturer (OEM) thermal bypass valve from the transmission before installing the thermal bypass valve.

* * * * *